United States Patent
Nicoletti et al.

(10) Patent No.: US 9,663,392 B2
(45) Date of Patent: May 30, 2017

(54) AMENDMENT-FREE SLUDGE COMPOSTING

(75) Inventors: Richard M. Nicoletti, Petersham, MA (US); Lewis Naylor, Goshen, IN (US)

(73) Assignee: Evoqua Water Technologies LLC, Warrendale, PA (US)

( * ) Notice: Subject to any disclaimer, the term of this patent is extended or adjusted under 35 U.S.C. 154(b) by 1007 days.

(21) Appl. No.: 12/688,589

(22) Filed: Jan. 15, 2010

(65) Prior Publication Data

US 2010/0184131 A1  Jul. 22, 2010

Related U.S. Application Data

(60) Provisional application No. 61/145,239, filed on Jan. 16, 2009.

(51) Int. Cl.
*C02F 11/18* (2006.01)
*C05F 17/00* (2006.01)
*C05F 17/02* (2006.01)

(52) U.S. Cl.
CPC .......... *C02F 11/18* (2013.01); *C05F 17/0018* (2013.01); *C05F 17/0036* (2013.01); *C05F 17/0063* (2013.01); *C05F 17/0072* (2013.01); *C05F 17/02* (2013.01); *Y02P 20/145* (2015.11); *Y02W 30/43* (2015.05)

(58) Field of Classification Search
None
See application file for complete search history.

(56) References Cited

U.S. PATENT DOCUMENTS

| | | | | | |
|---|---|---|---|---|---|
| 2,947,619 | A | * | 8/1960 | Gorby | 71/9 |
| 3,462,275 | A | * | 8/1969 | Bellamy | 426/53 |
| 3,845,939 | A | * | 11/1974 | Waldenville | 366/151.1 |
| 4,255,389 | A | * | 3/1981 | Jung et al. | 435/290.3 |
| 5,354,349 | A | * | 10/1994 | Inoue | 71/9 |
| 5,387,036 | A | * | 2/1995 | Hagen et al. | 366/346 |
| 5,534,437 | A | * | 7/1996 | Arrau | 435/290.3 |
| 5,558,686 | A | * | 9/1996 | Lavelle, IV | 44/606 |
| 5,744,351 | A | * | 4/1998 | Bryan-Brown | 435/290.2 |
| 5,906,436 | A | * | 5/1999 | Cole et al. | 366/346 |
| 6,281,001 | B1 | | 8/2001 | McNelly | |
| 6,627,434 | B1 | | 9/2003 | McNelly | |
| 7,972,517 | B1 | * | 7/2011 | Miller | 210/710 |
| 2005/0061044 | A1 | * | 3/2005 | Cruson et al. | 71/6 |
| 2005/0077236 | A1 | * | 4/2005 | Le | 210/603 |

(Continued)

FOREIGN PATENT DOCUMENTS

IE    EP 099194    *  5/2000 ............... C05F 9/04

OTHER PUBLICATIONS

Parvaresh et al , Determination of Carbon/Nitrogen Ratio and Heavy Metals in Bulking Agents Used for Sewage Composting, Iranian J. Publ. Health, vol. 33, No. 2, pp. 20-23 (2004).*

(Continued)

*Primary Examiner* — Thomas J Visone

(57) ABSTRACT

A composting system for promoting aerobic microbial activity in a composting bed. The system includes at least one composting bay for receiving composting material and an agitator for aerating and displacing composting material as it travels through the composting bay. Compost produced by the system is used in place of traditional woody amendment material for mixing with incoming material to be composted.

54 Claims, 19 Drawing Sheets

(56) References Cited

U.S. PATENT DOCUMENTS

2005/0235715 A1* 10/2005 Devine et al. ................. 71/6
2006/0283220 A1* 12/2006 Moss ............................. 71/6

OTHER PUBLICATIONS

Richard, Thomas, Municipal Solid Waste Composting: Physical Processing, Fact Sheet 1 of 7, Mar. 26, 2004.*
Kajitvichyanukul et al, Handbook of Environmental Engineering, vol. 7, 415-442 (2008).*
Alibardi, L. and Cossu, R. Aerobic Stabilization of Tannery Sludge Mixed With Compost. In: Eleventh International Waste Management and Landfill Symposium, Oct. 1-5, 2007, S. Margherita di Pula—Cagliari, Sardinia, Italy (2007).*
Kruger et al., "Where's the Bulk?" City of San Angelo Publication (2006).*
Wortman et al., Progressive Dairy Publishing (2007).*
WSU, Compost Fundamentals (2008).*
International Search Report and Written Opinion in corresponding International Application No. PCT/US10/21219 dated, Mar. 3, 2010.

\* cited by examiner

AMENDMENT-FREE SLUDGE COMPOSTING

RELATED APPLICATIONS

This application claims priority under 35 U.S.C. §119(e) to U.S. Provisional Application Ser. No. 61/145,239, entitled "MECHANICALLY ENHANCED SLUDGE BIODRYING," filed on Jan. 16, 2009, which is herein incorporated by reference in its entirety.

BACKGROUND OF INVENTION

1. Field of Invention

The present invention is directed to the disposal of organic wastes through composting and, more specifically, to composting systems for large scale treatment of industrial and municipal wastes.

2. Discussion of Related Art

Composting is a biological process of decomposition. Given adequate time and the proper environmental conditions, microorganisms turn raw organic matter into stabilized products. The products of composting include carbon dioxide, water, and a complex form of organic matter called compost, which is especially useful as a soil amendment. For the purposes of this specification "compost" shall be defined as "a mixture of biodried, biostabilized biosolids." Parameters of importance in composting process management are the available carbon to nitrogen ratio, the moisture content, the oxygen content, and the temperature of the composting material.

Carbon serves primarily as a food source for the microorganisms involved in composting. Nitrogen is the primary constituent of protein which forms over 50% of dry bacterial cell mass and is, therefore, necessary for protein synthesis and the optimal growth of microbial populations in composting matter. It is well known in the art that the preferred carbon-to-nitrogen ratio for composting is about 20-40 parts carbon for each part nitrogen by weight (20:1-40:1). At lower ratios, the excess nitrogen supplied would be expected to be lost in the form of volatile nitrogen compounds, such as ammonia gas, and can cause undesirable odors or other environmental problems. Higher carbon-to-nitrogen ratios result in an insufficient supply of nitrogen for optimal microbial population growth, resulting in a slow rate of degradation.

The carbon-to-nitrogen ratio can be increased through the addition of materials high in carbon, such as fallen leaves, straw, woodchips, sawdust, bark, paper, cardboard, and the like. These types of materials will herein be referred to as "traditional compost amendment materials," "amendment materials," or "traditional amendment materials." These types of materials are typically high in cellulose. For example, about 33 percent of most plant matter is cellulose (the cellulose content of cotton is 90 percent and that of wood is 50 percent.)

The carbon-to-nitrogen ratio can be decreased by the addition of materials high in nitrogen, such as vegetables, coffee grounds, grass clippings, manure, sewage, or the like. Sewage, such as that which is commonly supplied as influent into a typical municipal wastewater treatment plant, is not significantly cellulosic, containing little cellulose other than trace amounts due to undigested plant material, paper, or other such material present in the waste stream. As used herein, the term "non-cellulosic materials" will encompass materials which are substantially non-cellulosic, for example, sewage, and dewatered municipal wastewater sludge. Also, as used herein, the terms "sludge," "sewage sludge," "mixed sludge," "municipal wastewater sludge" and the like will encompass both primary sludge (sludge which includes solids settled out, skimmed off the surface of influent wastewater in a primary clarifier, or otherwise mechanically separated from the wastewater prior to secondary treatment) as well as waste activated sludge (sludge which includes solids, including microorganisms, removed from a secondary treatment aeration basin or other secondary treatment process) and combinations thereof.

In some locations, the availability of materials such as wood chips or waste paper products, or other materials traditionally used as sources of carbon, or as bulking agents to add porosity to a feed mix for a composting operation, may be limited, or may be prohibitively expensive for use in composting operations. These types of materials may in some instances be preferably used for fuel for heating or energy production, for animal bedding, landscaping mulch, biofilter media, or for other purposes. The availability of these traditional compost amendment materials may vary by season. For example, demand for wood chips for use as a fuel for heating may increase in cold seasons in some locations. Sourcing, transportation, and storage expenses may also make the provision of cellulosic or other traditional compost amendment materials prohibitively expensive, especially if these materials are in short supply or not available proximate the composting operation.

Moisture content is another key parameter of composting material. Microbially induced decomposition occurs most rapidly in liquid films found on the surfaces of organic particles. Whereas inadequate moisture content inhibits bacterial activity, excess moisture content can inhibit the aerobic process. Excess water may plug openings or open space in the material inhibiting permeation and movement of air (oxygen) into and (carbon dioxide) out of the composting material, with the consequence of formation of anaerobic conditions. This anaerobic activity can produce undesirable odorous compounds, such as hydrogen sulfide or methane. The moisture content of a composting pile is typically related to the carbon-to-nitrogen ratio in that degradable materials that are high in carbon are typically correspondingly low in moisture; materials that are high in nitrogen are typically high in moisture.

Excessive moisture content can also result in the leaching of essential nutrients from the composting pile, including phosphorus, potassium, and other trace minerals, which are essential to microbial metabolism. Although these nutrients are not normally limiting, they must be present in adequate supplies for microbial activity.

Oxygen content and temperature are important environmental parameters of composting that fluctuate in response to microbial activity which consumes oxygen and generates heat. As microorganisms oxidize carbon for energy, oxygen is used up, and carbon dioxide is produced. Without sufficient oxygen the process will become anaerobic and produce odorous compounds such as volatile acids and reduced sulfur and nitrogen compounds. Oxygen content is also linked to moisture content in that excessive moisture content can reduce the available oxygen supply resulting in anaerobic pockets within the composting pile. Oxygen can be provided to microbes in a composting pile through the introduction of air into the pile, given that the pile has sufficient porosity to permit the air to permeate the pile.

The temperature of a composting pile varies according to the type and size of the microorganism community resident therein. Mesophilic microorganisms are dominant from the initial stage of decomposition until the temperature rises above about 40° C. and rapidly break down the soluble, readily degradable compounds. The mesophilic microorganisms become less competitive as the temperature rises above about 40° C., and thermophilic microorganisms take over.

As composting has become increasingly popular in recent years as a means for recycling a variety of organic materials as part of municipal and industrial solid waste management programs, various composting technologies have been or are being developed. These technologies include, for example, static pile composting, windrow composting, aerated windrow composting, and in-vessel composting employing horizontal agitated bay reactors and vertical reactors. In such systems, cost effectiveness and automation are typically desirable. Regarding cost, reducing the space required for a given throughput of composting material is a well recognized need in the industry. Composting operations employing windrows, for example, are thought to have an undesirably low ratio of composting materials throughput to processing area square footage. In in-vessel and closed reactors, compost material may typically be mounded up to 20 feet high. This mounding, however, produces technical difficulties regarding the adequacy of aeration in the reactor vessel leading, in some cases, to unacceptably large pockets of anaerobic activity within the pile. This anaerobic activity leads to the equally undesirable need for removal of odorous compounds from the reactor vessel environment before exhausting it to the atmosphere.

Certain in-vessel composting systems, particularly those comprising open bays within a building, have been used with excellent results. One system of this type, the IPS™ composting system, available from Siemens Water Technologies Corp. (Warrendale, Pa., USA), employs one or more automated agitators to thoroughly mix and aerate composting material in parallel bays. Starting at the discharge end of an open elongated composting bay, an agitator moves through the bed of composting material toward the loading end of the bay. Typically, the agitator travels through each bay mixing the material and rearwardly displacing it from the loading end of the bay toward the discharge end of the bay. In some agitator models, as the agitator progresses through the bay, a moveable member repeatedly repositions itself in the exhaust stream such that the distance of rearward displacement of composting material is gradually increased to accommodate material which has had progressively less residence time in the bay and, accordingly, has experienced less reduction in the volume due to decomposition and moisture content reduction. An agitator of this type is described by Hagen et al., in U.S. Pat. No. 5,387,036 which is incorporated herein in its entirety by reference.

As demands on municipal composting systems increase, the capability of treating larger volumes of composting material in relatively small reaction vessels becomes increasingly desirable. Accordingly, some existing systems having a plurality of open horizontal bays, typically between about 6 and 10 feet wide and up to about 300 feet long have been excessively loaded forming composting beds of increasing heights. A plurality of open bays are typically placed side by side and can be served by a single agitator. These systems can be used to compost a wide variety of materials, and the composting rate can typically be regulated to meet varying demand. When these large bays are at or near full capacity, however, the action of the rotating drum of the agitator tends to burrow through the composting pile as the agitator progresses through the bay. As the burrowing action continues, the weight of the undisplaced composting material can become sufficiently great to allow large quantities to suddenly collapse onto the rotating drum, thus slowing its rotation and, consequently, the agitator's progression through the bay. If a sufficient quantity of composting material collapses, the rotating mechanism can stall, resulting in costly delays while the unit is stopped, reversed, cleaned and/or repaired.

Furthermore, in a typical large scale composting operation, air contact along with the rising heat produced by microbial action may combine to dry the upper portion of the composting bed, forming a crust-like layer of composting material near the top of the composting bed. As the agitator travels through the bay, large sections of the crust remain intact for extended periods and then, suddenly, crack and fall onto the rotating drum, which increases the stalling frequency of the rotating mechanism.

In order to reduce the stalling frequency of the rotating mechanism of agitators used in some large scale composting operations, bridge breakers may be mounted to the agitator mechanism to assist in the breakup of the upper portion of the composting bed. These bridge breakers may comprise static or oscillating blades or other displacement mechanisms which may displace the composting material above the feeder, causing the material to fall substantially evenly onto the feeder, thereby preventing large amounts of composting material from suddenly collapsing onto the feeder which can result in overload conditions on the feeder drive mechanism. Bridge breakers of this type are described by Cole et al., in U.S. Pat. No. 5,906,436 which is incorporated herein in its entirety by reference.

SUMMARY OF INVENTION

In accordance with the present invention, in-vessel composting methods, systems and apparatus are provided. The invention is applicable to the composting of a wide variety of materials, for example, organic wastes, including municipal sewage sludge and solid waste, yard wastes, shredded paper and magazines, as well as a number of industrial, commercial, and agricultural wastes.

In accordance with one embodiment of the present disclosure there is provided a method of sludge biodrying. The method comprises providing a non-cellulosic first material, providing a compostable sludge, forming a mixed sludge consisting essentially of the first material and the compostable sludge, introducing the mixed sludge into a composting bay, aerating the mixed sludge in the composting bay, mechanically agitating the mixed sludge in the composting bay, providing conditions to facilitate a heating of the mixed sludge within the composting bay for a period of time sufficient to form a compost, and removing the compost from the composting bay.

In accordance with one aspect of the method, the mixed sludge has a C:N ratio of less than about 15:1 by weight when introduced into the composting bay.

In accordance with one aspect of the method, the first material consists of compost.

In accordance with one aspect, the method further comprises removing particles below a predetermined size from the first material prior to forming the mixed sludge.

In accordance with one aspect of the method, providing a source of a compostable sludge consists of providing a source of dewatered sewage sludge.

In accordance with one aspect of the method, providing conditions to facilitate a heating of the mixed sludge further comprises decomposing the mixed sludge by a digestive action of microorganisms.

In accordance with one aspect, the method further comprises removing moisture from the mixed sludge.

In accordance with one aspect of the method, heating the mixed sludge comprises heating the mixed sludge to a temperature for a time sufficient to achieve destruction of pathogens within the mixed sludge. Heating the mixed sludge may comprise maintaining a temperature of the mixed sludge of at least about 55° C. for a period of at least 72 hours. The time and temperature at which the mixed sludge is treated may satisfy the equation $D=131,700,000/10^{0.14t}$ where, D=time in days; and t=temperature in degrees Celsius.

In accordance with one aspect of the method, heating the mixed sludge comprises heating the mixed sludge to a temperature for a time sufficient to deactivate pathogens within the mixed sludge.

In accordance with one aspect of the method, heating the mixed sludge comprises heating the mixed sludge to a temperature sufficient for Vector Attraction Reduction. Heating the mixed sludge may further comprise heating the mixed sludge for a time sufficient for Vector Attraction Reduction. Heating the mixed sludge may comprise heating the mixed sludge to a temperature of at least about 40° C. for at least 14 days.

In accordance with one aspect of the method, a pH of the mixed sludge introduced into the composting bay is less than about 7.0. The pH of the mixed sludge introduced into the composting bay may be less than about 6.0.

In accordance with one aspect, the method further comprises providing a portion of the compost removed from the composting bay as a combustible fuel.

In accordance with one aspect, the method further comprises forming the sludge from pre-screened wastewater.

In accordance with one aspect of the method, the mixed sludge is maintained aerobically in the composting bay.

In accordance with one aspect of the method, agitating the mixed sludge comprises displacing the mixed sludge in the composting bay in a direction from a first end of the composting bay to a second end of the composting bay.

In accordance with one aspect, the method further comprises sensing a temperature of the mixed sludge at least one position in the composting bay. The method may further comprise generating a signal in response to said temperature. The method may further comprise receiving said signal at a controller. The method may further comprise actuating a ventilation system to conduct air into the mixed sludge when the temperature thereof rises above a preset value. The method may further comprise initiating an agitation of the mixed sludge when the temperature thereof falls below a preset value.

In accordance with one aspect, the method further comprises sensing a moisture level of the mixed sludge at least one position in the composting bay. The method may further comprise generating a signal in response to the moisture level. The method may further comprise receiving the signal at a controller. The method may further comprise adding moisture to the mixed sludge when the moisture level thereof falls below a preset value. The method may further comprise actuating a ventilation system to conduct air into the mixed sludge when the moisture level thereof rises above a preset value.

In accordance with another embodiment of the present disclosure, there is provided a method of sludge biodrying. The method comprises providing a carbon containing first material, providing a nitrogen containing compostable sludge, forming a mixed sludge consisting essentially of the first material and the compostable sludge and having a C:N ratio of less than about 15:1 by weight, introducing the mixed sludge into a composting bay, maintaining an average C:N ratio of at least about 8:1 by weight in the mixed sludge in the composting bay, providing conditions to facilitate the formation of compost from the mixed sludge, removing the compost from the composting bay, and recycling a portion of the compost as the first material.

In accordance with one aspect of the method, the first material consists of heat dried undigested sewage sludge.

In accordance with one aspect of the method, the nitrogen containing compostable sludge consists of dewatered sewage sludge.

In accordance with one aspect of the method, the first material consists essentially of a non-cellulosic material.

In accordance with one aspect of the method, the first material consists of compost removed from the composting bay.

In accordance with one aspect of the method, forming the compost comprises aerating the mixed sludge in the composting bay, mechanically agitating the mixed sludge in the composting bay, providing conditions to facilitate a heating of the mixed sludge within the composting bay, and reducing a moisture content of the mixed sludge within the composting bay.

In accordance with one aspect of the method, the mixed sludge has a C:N ratio of less than about 15:1 when introduced into the composting bay.

In accordance with one aspect of the method, the pH of the mixed sludge introduced into the composting bay is less than about 7.0. The pH of the mixed sludge introduced into the composting bay may be less than about 6.0.

In accordance with another embodiment of the present disclosure, there is provided a composting facility. The composting facility comprises a composting bay configured to receive organic waste material and to hold the material while it composts, the composting bay including a frame defining an interior of the composting bay, a mixed sludge retained within the interior of the composting bay and having an average carbon to nitrogen ratio of less than about 15:1, a compost handling machine adapted to move along the frame and to extend into the interior of the composting bay to agitate the mixed sludge therein, a ventilation system in communication with the interior of the composting bay configured to selectively conduct air into the mixed sludge to ventilate the mixed sludge and to facilitate control of the temperature thereof, a transport system adapted to transport compost from a discharge area of the composting bay to a mixing area, and a mixing mechanism configured to mix a portion of compost transported from the discharge area of the composting bay with the organic waste material to form the mixed sludge.

In accordance with one aspect of the composting facility, the ventilation system comprises a temperature sensor located in the bay configured to sense the temperature of the mixed sludge and to generate a signal in response to the temperature, and a control system connected to the temperature sensor configured to receive the signal and to actuate the ventilation system to conduct air into the mixed sludge when the temperature thereof rises above a preset value.

In accordance with one aspect of the composting facility, the ventilation system maintains a desired temperature profile in the mixed sludge.

In accordance with one aspect, the composting facility further comprises an odor control system. The odor control system may comprise at least one of an ammonia scrubber and a biofilter.

In accordance with one aspect of the composting facility, the compost handling machine is further adapted to move the mixed sludge through the interior of the composting bay.

In accordance with one aspect, the composting facility further comprises an analyzer configured to analyze a portion of the mixed sludge and to indicate a concentration of a specified element within the portion of the mixed sludge.

In accordance with one aspect, the composting facility further comprises a moisture content analyzer configured to analyze the moisture content of organic waste material to be composted and output a first result indicative of the moisture content of the organic waste material. The moisture content analyzer may be further configured to analyze the moisture content of compost and output a second result indicative of the moisture content of the compost. The composting facility may further comprise a controller adapted to receive the first result and the second result output by the moisture content analyzer and to calculate and output a ratio of compost to organic matter to mix to form the mixed sludge based on the first result and the second result.

In accordance with one aspect, the composting facility further comprises a position sensor configured to monitor a position of the compost handling machine. The composting facility may further comprise a temperature sensor in thermal communication with a section of the composting bay and configured to generate a signal in response to a temperature of the mixed sludge in the section, and a control system connected to the temperature sensor and to the position sensor and configured to receive a signal from the temperature sensor and from the position sensor and to actuate the ventilation system to conduct air into the mixed sludge in the section when the temperature of the mixed sludge therein is above a preset value and the compost handling machine is positioned in said section.

In accordance with one aspect, the composting facility further comprises a humidity sensor configured to generate a signal in response to a level of humidity in the composting facility and a control system connected to the humidity sensor and configured to receive the signal from the humidity sensor and to actuate a ventilation fan based upon a comparison of the signal with a predetermined value. The control system may be further configured to receive a signal from a position sensor configured to monitor a position of the compost handling machine and to increase a speed of the ventilation fan proximate a section of the composting bay when the compost handling machine is located in that section of the composting bay.

In accordance with another embodiment of the present disclosure, there is provided a method of facilitating a reduction in the consumption of a cellulosic amendment material in a composting operation. The method comprises providing instructions for forming a mixed sludge consisting essentially of a carbon containing first material and a nitrogen containing compostable sludge and having a C:N ratio of less than about 15:1 and providing apparatus configured to maintain an average C:N ratio of at least about 8:1 for the mixed sludge once introduced into a composting bay and to maintain the mixed sludge under conditions to facilitate the formation of compost. In accordance with one aspect of the method, the first material is the compost.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
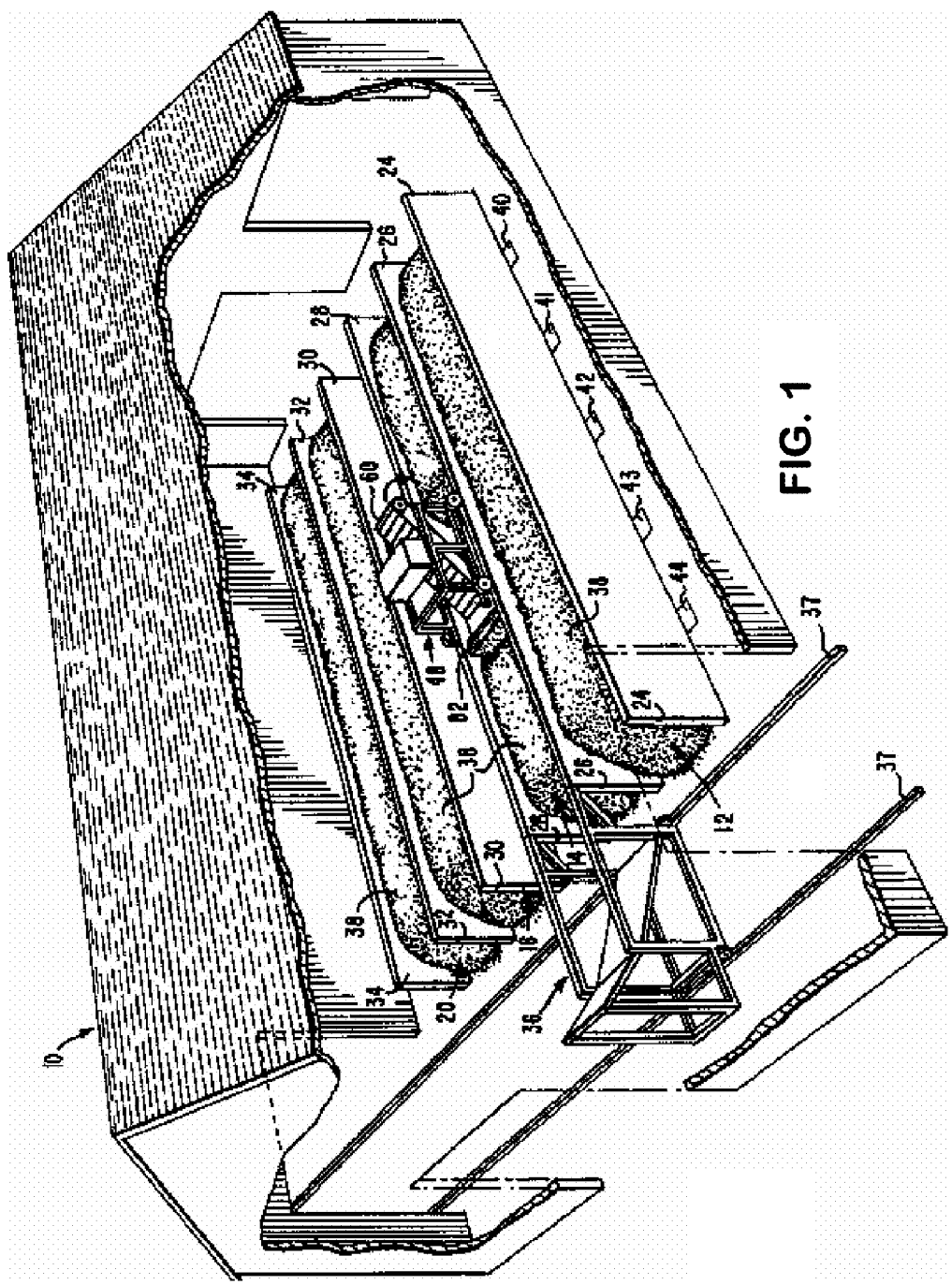
FIG. 1 is a perspective view of an in-vessel composting facility and system in accordance with one embodiment of the present disclosure.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

It should be understood that directional terms employed herein are for ease of reference. The term traverse is used to mean extending laterally (from side wall to side wall) generally perpendicular to the longitudinal direction of travel of the agitator in the bay. The terms compost bed depth (or simply bed depth), compost bed height (or simply bed height), and pile height are used interchangeably herein. Dry solids and volatile solids percentages are expressed herein on a weight percent basis. Ratios of materials and ratios of elemental components of materials are also expressed herein on a weight percent basis.

Disclosed herein is an agitator which will be described as moving forwardly through a bed of composting material in a composting bay, generally meaning from a discharge end of the bay to a receiving end of the bay. Thus, the first composting material encountered by the agitator at the discharge end of the bay is displaced rearwardly from the bay, the in-vessel composting portion of the operation having been substantially completed for that portion of the bed. At the receiving end of the bay the agitator displaces the most recently received material rearwardly, thereby making space available in the bay for receiving fresh compostable material.

While the agitator of the present disclosure and an optional variable displacement discharge provided by an optional regulator means of the agitator can be employed in a variety of applications within the scope of the present disclosure, the embodiments described in greater detail below are advantageously applied in accordance with the IPS™ agitated multibay composting system, available form Siemens Water Technologies Corp. (Warrendale, Pa., USA). Such embodiments are modular, the basic module being an open horizontal bay, usually about 6 to about 12 feet wide, and about 100 to about 300 feet long. A plurality of open bays can be placed side-by-side and served by a single agitator, although in some embodiments, multiple agitators may be utilized. A pass of the agitator through a bay typically requires about 1 to 2 hours, although this time may be greater or less than this depending on factors such as the density of the composting material bed. The system can be used to compost a wide variety of materials and the rate of composting can be regulated to meet varying levels of demand. The open bays may be readily enclosed within a building from which air can be exhausted directly to the atmosphere or through odor-controlling biofilters, chemical scrubbers, or other means of odor control.

Figure 2:
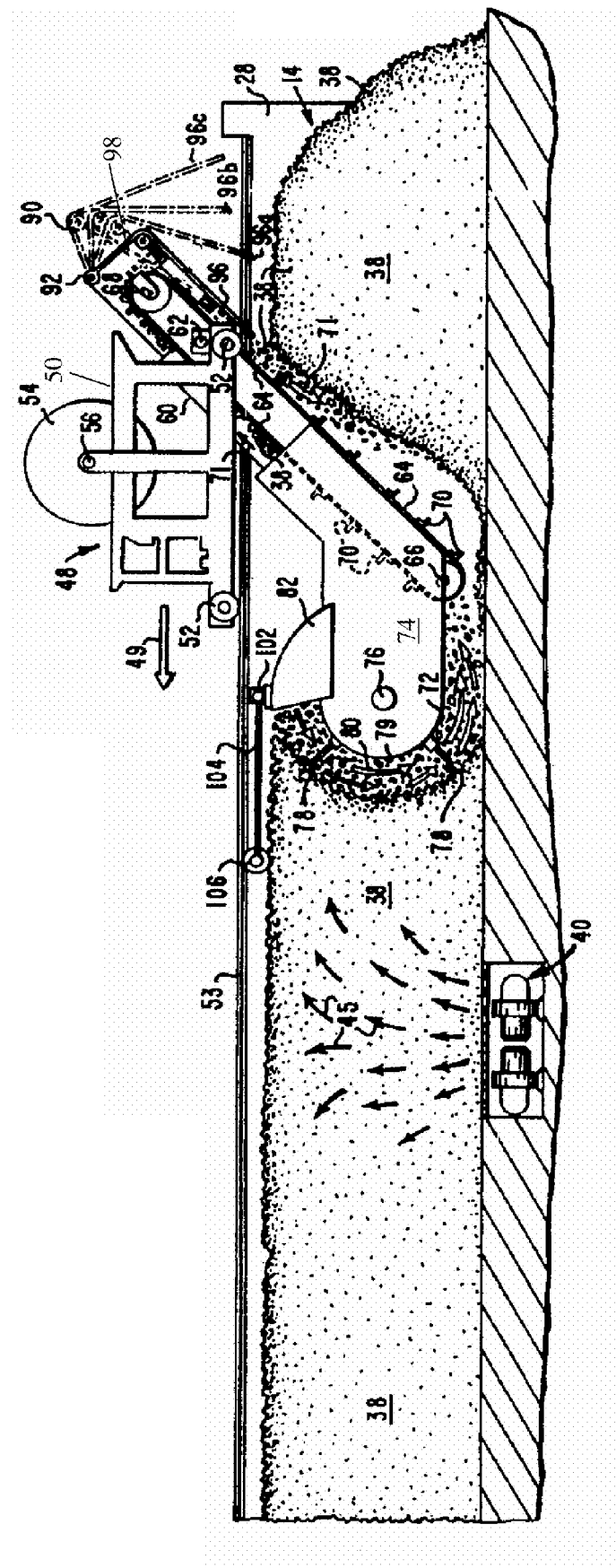
FIGS. 2 and 3 are enlarged side elevation views of the agitator in the system illustrated in FIG. 1.
Figure 3:
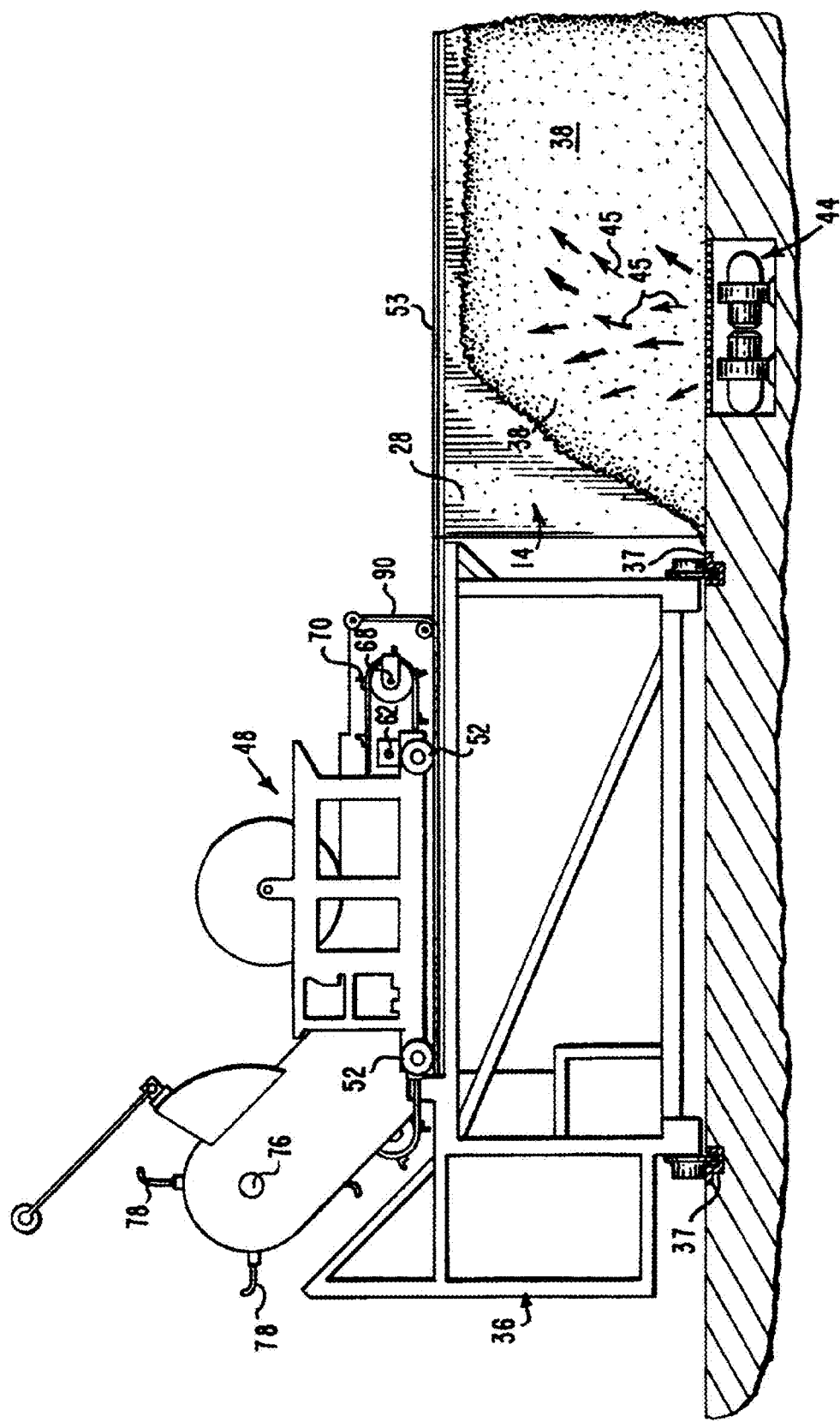

Referring now to FIGS. 1 to 3, an in-vessel composting system is shown within a schematically illustrated enclosure building 10. The system comprises multiple adjacent, parallel composting bays 12, 14, 16, and 20. The bays are formed by parallel upstanding concrete walls 24, 26, 28, 30, 32, and 34. Other suitable bay forming means will be readily apparent to those skilled in the art in view of the present disclosure. A bed of composting material 38 in each bay is seen to have a substantially uniform depth, although in some embodiments a depth of the bed of composting material may be non-uniform throughout a bay, for example, decreasing in height from a receiving to a discharge end of a bay. Typically, a bed depth of about five feet would be maintained in a six foot high composting bay. In some embodiments, bay heights of seven or eight feet may be provided. In these embodiments, the bed depth would typically be provided such that the top of the bed was approximately one foot below the top of the bay.

In a composting operation for composting a sewage sludge mix in accordance with the present disclosure, the dry solids content of the composting material generally will start at the receiving end of the bay at less than half by weight of the total material. For example, the composting material starting at the receiving end of the bay may include between about 30%-45% dry solids. This level of dried solids may facilitate adequate agitation of the mixed sludge in the composting bay with commercially available agitators, while utilizing an acceptably low amount of amendment material. One skilled in the art will recognize, however, that a dry solids content of the composting material to be introduced into the receiving end of the bay may be adjusted to a desired level. For example, higher solids content may be achieved by adding additional amendment or by performing action on the sludge to dry it additionally. A lower solids content could be achieved by adding less amendment material or by adding (or not removing) moisture to the sludge.

The dry solids content preferably will have increased by the time the composting material reaches the discharge end of the bay to more than 50%, for example, up to 90%, depending upon the desired degree of dryness. One skilled in the art will recognize, however, that a dry solids content of the composted material may be adjusted to a desired level, subject to constraints due to the biology of the microorganisms utilized to digest the composting material. If a higher degree of dryness is required, a longer composting time and or an increased amount of aeration may be utilized. If a lower degree of dryness is required, a shorter composting time may be utilized. Further, in embodiments where the composted material is screened after discharge from the bay to, for example, separate larger from smaller particles, a minimum dry solids content of around 50% may be desirable to facilitate the screening process while not clogging the screen.

As further discussed below, in some embodiments of the present disclosure, the height of the bed of composting material in the bay may be maintained at a uniform level notwithstanding the loss of moisture from the composting material. In other embodiments, the height of the bed of composting material in the bay may change with the age and/or the moisture content of the composting material in a particular portion of the bay.

Composting material in such composting operations may vary in residence time in composting bays depending on factors such as a desired degree of composting, regulatory requirements, or process parameters. For example, composting material in such composting operations is in some embodiments resident in the composting bay for approximately 14-56 days. The composting material residence time may vary depending upon, for example, the type of material to be composted, a desired level of breakdown of said material, a desired level of achieved moisture reduction in said material, an ambient temperature, or due to environmental regulations of a region in which the composting operation is performed. For example, in operations where a shorter residence time is desired, parameters such as agitation of the compost may be altered to increase the temperature of the composting material to achieve a desired level of moisture reduction within a shorter time period. In some embodiments, an agitator will pass through each bay once per day, with the potential for skipping one or more days per week if the composting facility is not in operation every day of the week, while in other embodiments agitation may be performed by running an agitator through a bay on a less frequent basis, for example, once every two, three, or four days.

Those skilled in the art will recognize that material discharged from the bay may require finished product curing. Material loaded into the composting bay also may be pretreated, for example, reduced in size by means of a chopper/shredder and the like to facilitate its processing in the bay. Post processing may include screening to remove wood chips or other larger sized components of the material, which can be recycled. The composting material also may be retained on-site for extended periods. In cold winter areas, for example, finished compost material suitable for use as a soil amendment or the like may be retained on the composting site during winter months when demand for such material is lower. Of course, those skilled in the art are aware of alternative types of beneficial re-use of the finished product of the composting operation.

Blowers 40, 41, 42, 43, and 44, at spaced locations along the bays, force air 45 up through the bed of composting material. Typically, a bay has multiple, for example, three to six, aeration zones, one or more temperature sensors, and a computer control feedback (I/O) response system, to maintain aerobic conditions and control composting temperatures. Recessed temperature sensors may be used. Suitable such sensors are known to those skilled in the art. The particular type of blowers, number of aeration zones, type and/or number temperature sensors, etc., may be substituted and some of these elements may be eliminated without departing from the scope of various embodiments of the present disclosure. Further, the composting facility building 10 may have one or more ventilation fans or other air moving devices (not shown) in a ceiling or walls thereof for removing humid air from within the building.

In some embodiments, the temperature is maintained at a level of 55° C. or higher for three consecutive days to achieve pathogen destruction. In some embodiments, the temperature in later portions of the bed (that is, closer to the discharge end of the bay) is maintained at temperatures below about 55° C., or in other embodiments, from about ambient room temperature (20° C.) to about 45° C., for good bacteria efficiency in the composting process.

Requirements for the treatment of the composting pile to achieve a regulatorily acceptably "clean" compost may vary by jurisdiction. Current United States Environmental Protection Agency regulations (US EPA 40 CFR §503, 2009) define criteria for pathogen (including, but not limited to, *E. coli*) destruction for sewage sludge which is to be applied to agricultural land, forest, a public contact site, a reclamation site, a lawn, or a home garden. One criteria is that the sewage sludge in the composting pile be treated at a temperature in excess of 55° C. (131° F.) for three consecutive days to destroy pathogens within the composting pile. As used herein, a "day" is one continuous 24 hour period. Alternatively, the US EPA pathogen destruction criteria can be met by treating the sludge at a time and temperature defined by the equation:

$$D=131{,}700{,}000/10^{0.14t}, \text{ where } D\text{=time in days and}$$
$$t\text{=temperature in degrees Celsius.}$$

A further criteria which meets the requirements for pathogen destruction under US EPA 40 CFR §503 is that either the density of fecal coliform in the sewage sludge shall be less than 1000 Most Probable Number (MPN) per gram of total solids (dry weight basis), or the density of *Salmonella* sp. bacteria in the sewage sludge shall be less than three MPN per four grams of total solids (dry weight basis) at the time the sewage sludge is used or disposed, or at the time the sewage sludge is prepared for sale or give away in a bag or other container for application to the land.

Another criteria that may be required to be met in some jurisdictions for the production of an acceptable compost product is the achievement of an acceptable level of Vector Attraction Reduction (VAR)—a reduction in the characteristic of sewage sludge that attracts rodents, flies, mosquitoes, or other organisms capable of transporting infectious agents. One criteria for sludge treatment that meets the requirements for VAR according to US EPA 40 CFR §503 for sewage sludge which is to be applied to agricultural land, forest, a public contact site, or a reclamation site, a lawn, or a home garden, is that the sewage sludge is treated in an aerobic process for 14 days or longer. During that time, the temperature of the sewage sludge must be higher than 40° C. (104° F.) and the average temperature of the sewage sludge during the 14 day period must be higher than 45° C. (113° F.).

Of course, those skilled in the art will recognize that the particular temperature program, moisture content, residence time, etc. may be dictated by the particular composting operation and materials, and by applicable local, state and/or federal guidelines. Further, if operating in accordance with different goals (for example, to maximize drying or to minimize compost retention time) the time and temperature requirements for achieving a proper degree of composting may be different.

One embodiment of a level bed agitator 48, shown in enlarged side elevation in FIGS. 2 and 3, comprises a main frame 50 adapted to ride on wheels 52 on rails 53 on bay walls over the top of a composting bed as the agitator services the composting bed. The agitator travels in the direction of arrow 49 as it services the composting bed. Main frame 50 has power receiving means for operating the agitator, including preferably a power cable reel 54 which employs a hydraulic motor or like means to collect a power cable providing power to the agitator as it progresses toward the loading end of the bay. For this purpose, power cable reel 54 is rotatably mounted about a traverse axis by pinions 56.

The agitator further comprises a conveyor subassembly 60 pivotably mounted to the main frame 50 at transversely spaced pinions 62. In FIG. 2 the conveyor subassembly 60 is shown in its normal operating position. Preferably, lifting means are provided to lift the conveyor subassembly to a horizontal position, along with the feed drum mounted thereto, in preparing the agitator to be laterally (further discussed below) shuttled to the next bay and then moving the agitator to the discharge end of that next bay where it is again lowered to begin treatment of the composting bed therein. In FIG. 3 the agitator is shown mounted in a shuttle 36 which can carry the agitator laterally from bay to bay on rails 37.

In the embodiment illustrated in FIG. 2, the conveyor subassembly has an inclined plate 64 which extends upwardly and rearwardly from a lower return 66 to an upper return 68 above the bay walls. The plate 64 has a width such that it substantially crosses the full width of the bay. In some embodiments, the length of the conveyor from lower return 66 to upper return 68 is approximately 10 feet to 13.5 feet. A set of transversely extending flights 70, extend transversely substantially equal in width to plate 64, being connected at opposite ends to spaced locations along a pair of endless drive lines, preferably chains, driven over the upper and lower returns. Typically, the flights are spaced from each other approximately one foot, although different spacings may be utilized in different embodiments, for example, from about six inches to about two feet. In the embodiment illustrated, the flights travel upwardly in the direction of arrows 71 over inclined plate 64 on the forward side of subassembly 60. The flights push composting material upwardly over the inclined plate 64 and discharge the same rearwardly airborne at the top of the conveyor subassembly before returning down the back side of the conveyor subassembly. In some embodiments, the flights are substantially continuous across the width of the plate with straight lengthwise outer edges across this width. In alternate embodiments, the flights may have one or more notches in the outer lengthwise edges thereof. In some embodiments, the flights may be formed of flat plates with substantially parallel forward and rearward sides (the sides perpendicular to the movement of the flights), while in other embodiments, the flights may have beveled forward and/or rearward sides.

Generally, the conveyor subassembly is run at about 50-60 rpm, although it is well within the ability of those skilled in the art to select a suitable speed adapted to particular composting operations. Alternative conveyor means for carrying composting materials will be readily apparent to those skilled in the art in view of the present disclosure, including endless conveyor belts, augers, etc.

The conveyor subassembly receives composting material from the feed or agitator drum 72. Accordingly, the lower return 66 of the conveyor subassembly is located in close proximity thereto. The agitator drum 72 is mounted to a drum frame 74 carried by the conveyor subassembly 60. In the embodiment illustrated, the drum frame 74 comprises a pair of laterally spaced steel plate frame members on opposite sides of the conveyor subassembly. The agitator drum is mounted to the drum frame transversely for rotation about a horizontal drum axis 76 perpendicular to the direction of travel in the bay. Optionally, means are provided for clearing the lower bay walls. For example, scraper bars may be mounted to the agitator drum axle ends outside the plate steel frame members for rotation proximate the lower ½ of the bay walls as the agitator moves forward. Similar scraper bars may be mounted to the outside ends of the lower mounting shaft of the conveyor.

The agitator drum has outwardly extending teeth 78 for shearing into the bed of composting material in front of the agitator. The outwardly extending teeth 78 are spaced over outside circumferential drum surface 79. Alternate embodiments may employ protrusions such as blades instead of teeth 78 on the agitator drum, recesses rather than protrusions, or may include alternate types of, or in some embodiments, no protrusions. The agitator drum 72 rotates preferably in the direction of arrow 80.

Rotation of the agitator drum 72 feeds composting material to the conveyor subassembly 60. Accordingly, the agitator drum preferably is substantially laterally coextensive with the conveyor subassembly and, thus, preferably extends laterally almost the full width of the bay. The agitator drum rotates within partial drum housing 82, which aids in controlling the flow of composting material and in the control of dust.

In accordance with an aspect of the embodiment illustrated in FIG. 2, the optional adjustable composting material discharge regulator of the agitator regulates rearward displacement of the composting material by the conveyor subassembly. The adjustable composting material discharge regulator comprises a generally L-shaped discharge shroud 90 substantially laterally coextensive with the inclined plate 64. The discharge shroud is pivotably mounted about transverse pivot shaft 92 defining a horizontal shroud axis substantially parallel to the drum axis 76. Discharge shroud 90 is spaced from the flights 70 as they pass over the upper return 68 sufficiently to allow composting material to pass below it. As illustrated, discharge shroud 90 has an upper portion 94 at least partially covering the upper portion of the conveyor subassembly, and a rearward portion 96 extending from the upper portion behind the conveyor.

The position of the discharge shroud is adjustable about the shroud axis as the agitator progresses through the composting bed in the bay. More specifically, the discharge shroud 90 is moveable between a closed position and a full open position. In the closed position (illustrated in solid lines) the rearward portion of the discharge shroud extends downwardly and forward to direct composting material forward of the upper return 68. In progressively more open positions 96a-96c the rearward portion extends ever more rearwardly. In some embodiments, in the full open position the rearward portion 96 of the discharge shroud 90 does not significantly interfere with the rearward projection of composting material by the conveyor subassembly. In some embodiments, full rearward airborne displacement of composting material is about 12 to 14 feet. In one embodiment, the shroud in the closed position causes composting material to fall forward of the upper return.

Alternative suitable discharge regulating means for regulating rearward displacement of the composting material by the conveyor subassembly by airborne deflection will be readily apparent to those skilled in the art in view of the foregoing disclosure. Thus, for example, a baffle plate mounted for variable rearward spacing from the top of the conveyor subassembly, a variable sliding deck mounted at the bottom of a reversely rotating conveyor, variable angular disposition about a traverse pivot axis, or both, will enable rearward displacement regulation suitable for certain applications. Similarly, means for varying the angle of the conveyor subassembly or for telescoping the conveyor subassembly etc. will be understood to provide alternatives suitable in particular applications for regulating rearward displacement of the composting material. Further, some embodiments may include no shroud 90, baffle, or any other discharge regulating means for regulating rearward displacement of the composting material by the conveyor subassembly.

In some embodiments, a control system is provided for controlling the position of the discharge shroud 90. Numerous suitable alternative control means will be readily apparent to those skilled in the art in view of the present disclosure. In the embodiment illustrated, one or more laterally spaced fluid-powered cylinders 98 are attached at one end to the conveyor subassembly 60 and at the other end to the discharge shroud 90.

Those skilled in the art will recognize from the foregoing disclosure that adjustment of the position of the discharge shroud as the agitator progresses forwardly will control the location in the bay to which composting material is discharged by the agitator. Starting the discharge shroud in the closed position at the discharge end of a composting bay will enable development of a full depth bed at that end of the bay, notwithstanding the decreased volume of the composting material due to moisture or volatile solid loss at that end. Controlling the degree to which the discharge shroud is opened as the agitator progresses forwardly in the bay will similarly maintain development of a level bed behind the agitator. At the receiving end of the bay, at the end of the agitator's pass through the composting bed, in some embodiments, the shroud will be in the full open position in which it does not substantially interfere with the rearward displacement of composting material by the agitator. Such full rearward displacement is approximately 12 feet in some embodiments. There may, of course, be decreasing bed depth at the extreme ends of the bay.

The degree to which the discharge shroud is opened can be controlled by suitable control means simply as a function of the forward distance traveled by the agitator in the bay. Either in addition to or in lieu of such control function, sensors may be provided for sensing the depth of the bed of composting material and generating a bed depth signal corresponding thereto. In such embodiments, the agitator comprises a controller adapted to control the position of the discharge shroud at least partially in response to the bed depth signal. Suitable sensors include, for example, a rotatable wheel mounted at the end of a pivotably mounted arm extending forwardly of the feed drum 72. The bed depth signal may be generated in such embodiments as a function of the angle of the arm to a reference position. In the embodiment illustrated in FIG. 2, sensor 102 of this type is illustrated, comprising arm 104 carrying at its forward end a rotatable wheel 106. Arm 104 is pivotably mounted at the top of drum housing 82. The sensor member 106 alternatively may comprise a sonar signal transponder. The sensor may also, or alternatively, employ one or more electric eyes, or the like. Alternative suitable sensor means will be readily apparent to those skilled in the art in view of the present disclosure. In accordance with one embodiment, the depth of the composting bed is sensed along the length of the bay, this information being used to control the position of the discharge shroud during the next pass of the agitator through the composting bed. With reference to recording the bed depth for the next run, this can be accomplished by simple computer, in some embodiments on-board the agitator, and is well within the ability of those skilled in the art given the present disclosure.

Figure 4:
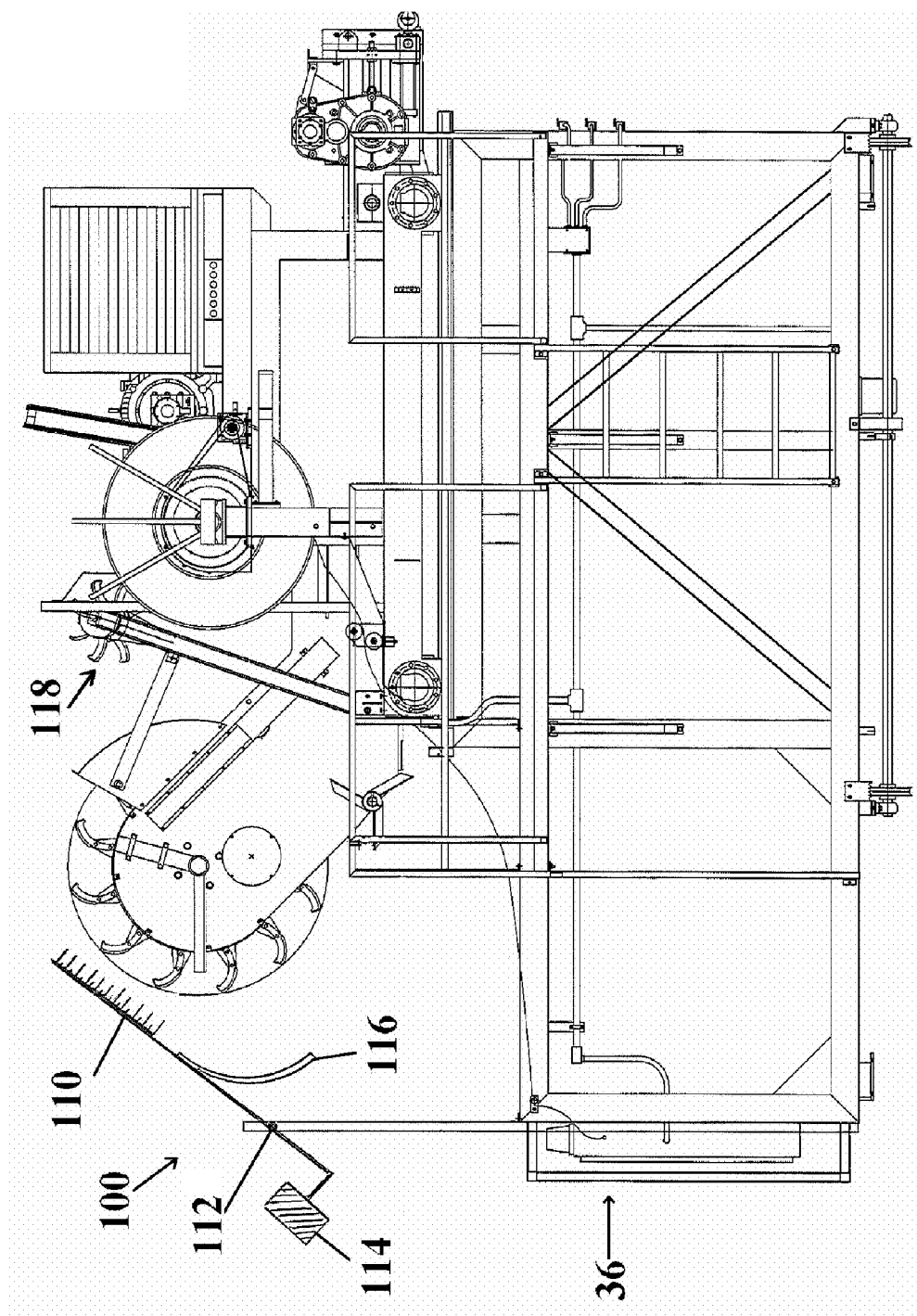
FIG. 4 is a side view of an embodiment of an agitator mounted on a shuttle and including an optional agitator cleaning apparatus.

In some embodiments, a cleaning mechanism may be provided to remove accumulated composting material from the drum of the agitator. For example, in FIG. 4 the agitator is shown mounted in a shuttle 36 similar to the shuttle 36 of FIG. 3 but with the addition of a drum tine cleaning mechanism 100 mounted on the frame of the shuttle. When the agitator docks on the shuttle it will push in to a brush board 110 mounted on a pivot arm connected to the shuttle by a pivot 112. The agitator will be programmed to have the drum spin for a fixed period of time until the drum tines are cleaned. A deflector shield 116 will ensure that material removed from the drum drops down to the floor inside the shuttle. The top end (the brush board end) of the cleaning mechanism is heavier than the bottom end, so the brush board 110 is drawn by gravity toward the drum. As the drum rotates (counter clock wise) it may kick that brush board away from the surface of the drum. The counterweight dampens the return motion of the brush board toward the drum and controls how hard against the drum the brush lays, thus minimizing the potential for the brush board to slam into and inflict damage to the drum. In alternate embodiments, a spring and/or shock absorber could be used to dampen motion of the brush board. Once the shuttle is moved, this material can be pushed in to the bay loading zone by a loader. Other forms or arrangements of brushes, scrapers, and the like could be included in addition to, or as an alternative to the cleaning mechanism illustrated in FIG. 4.

A breaker bar 118, discussed above, is also illustrated in FIG. 4 mounted behind the agitator drum. This breaker bar would be located above the agitator drum when the agitator drum was lowered into operational position in a composting bay.

Figure 5:
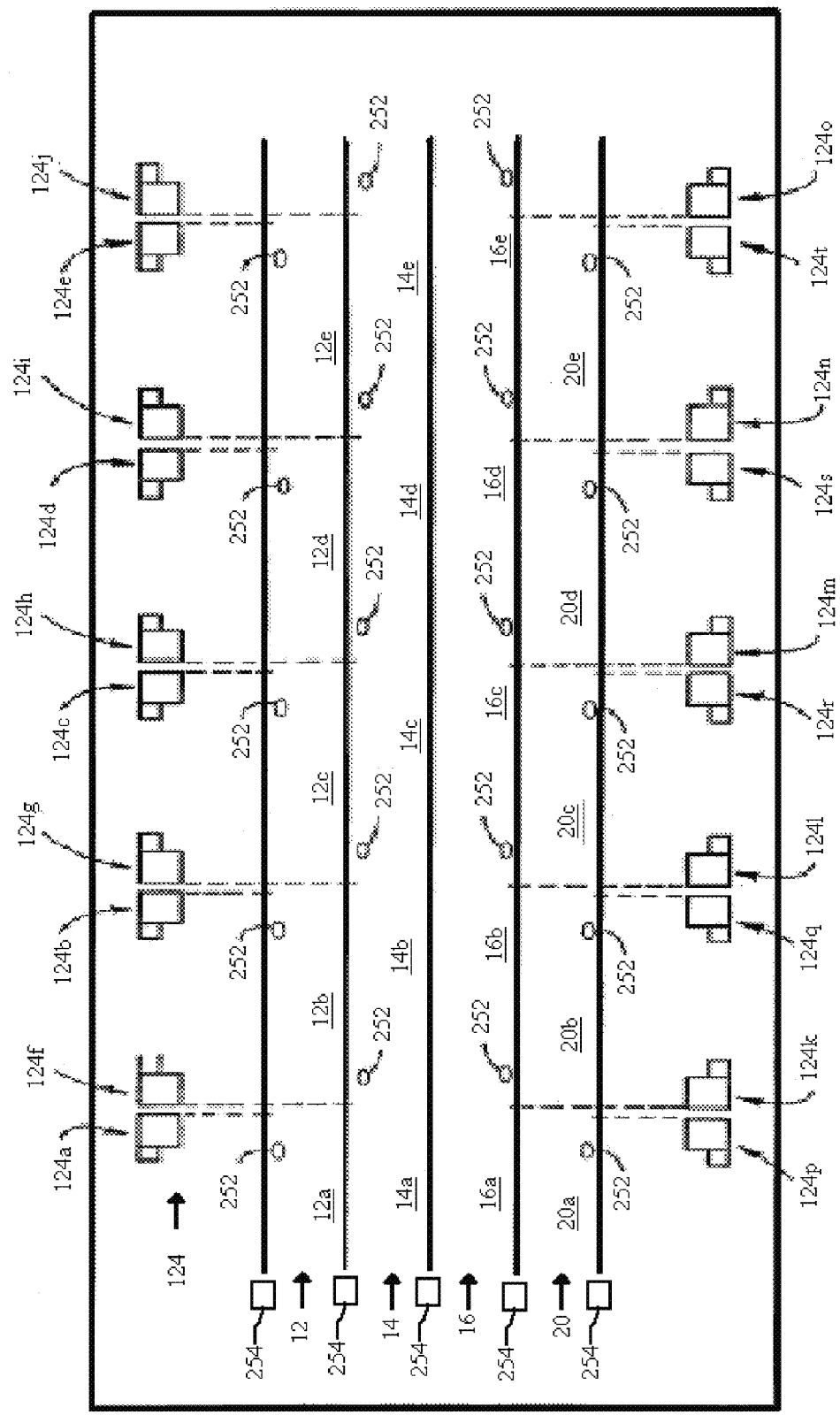
FIG. 5 is a plan view generally showing the outline of a composting facility in accordance with an embodiment of the present disclosure.

With reference to FIG. 5, ventilation system 124 is in communication with the interiors of composting bays 12, 14, 16, and 20 and is provided to selectively conduct air into the compost in those bays to ventilate the compost and to help control the temperature thereof. In some embodiments, the temperature of the composting material varies along the length of each bay, and ventilation system 24 includes a multitude of sensors, schematically shown at 252 in FIG. 5, to actuate the ventilation system to conduct air selectively into different sections of the composting bays to maintain desired compost temperature profiles. In some embodiments, any or all of bays 12, 14, 16, and 20 may be equipped with one or more position sensors 254. Position sensors 254 are adapted to monitor a position of an agitator present in the bays and communicate information regarding said position to an external controller. The sensors 254 may comprise electric eyes, sonar, ultrasound, or laser distance sensors, or other distance or position measurement sensors known in the art. The sensors 254 may be positioned at an end of the bays as illustrated in FIG. 5, or in some embodiments, may be included at multiple positions along the bays. In some embodiments, the position sensors 254 may be present on an agitator rather than at a fixed position within or at an end of a bay. In some embodiments, the ventilation system 124 is configured to activate a blower proximate to, or in some instances, directly below, an agitator in a bay if a temperature sensor 252 in that bay proximate the agitator registers a temperature that deviates from a desired temperature or temperature range and a position sensor 254 indicates that the agitator is located in that particular portion of the bay. This may lead to more efficient aeration of the composting material in the bay because as the agitator mixes the composting material, it becomes easier for air from a blower to enter into and aerate said material.

Further, a controller may receive a signal from one or more position sensors 254 and alter a speed of a ventilation fan (e.g., start, stop, or increase or decrease the speed of the fan) when an agitator moves into a position proximate said ventilation fan. The controller may also receive a signal from one or more humidity sensors (not shown) to make a determination of whether the ventilation fan speed should be altered. Starting a ventilation fan, or increasing a speed thereof when an agitator is in proximity to the ventilation fan will, in some embodiments, facilitate the removal of moisture from the building including the composting bays, and at the same time will facilitate keeping moisture from condensing back in to the compost or in an aisle between the bays where the aeration blowers may be situated.

With the embodiment illustrated in FIG. 5, each bay 12, 14, 16, and 20 includes a plurality of, specifically five, sections referenced as a, b, c, d, and e, respectively; and ventilation system 124 comprises a multitude of subsystems 124a-t, with each subsystem adapted to conduct air into a respective one of the bay sections.

These bay sections do not overlap, and they may be slightly spaced from each other. Thus, the first or "a" section of each bay comprises a forward portion of the bay and extends for a first preset length, and the second or "b" section of the bay is located rearward of the first section of the bay and extends for a second preset length. Similarly, the third or "c" section of each bay is located rearward of the second section of the bay and extends for a third preset length, the fourth or "d" section of the bay is located rearward of the third section of the bay and extends for a fourth preset length, and the fifth or "e" section of the bay is located rearward of the fourth section of the bay and extends for a fifth preset length. In some embodiments, it is unnecessary to ventilate the first few feet and the last few of each bay.

For instance, in one embodiment, the first ventilated section of each bay starts about twenty-five feet rearward of the front of the bay itself and is about twenty-five feet long, and the second section of each bay is also about twenty-five feet long. The third and fourth sections of each bay are each about thirty-five feet long, and the fifth section of each bay is also about thirty-five feet long and terminates about five feet before the end of the bay.

Ventilation subsystems 124a-e are provided to ventilate the composting material in bay sections 12a-e respectively; and ventilation subsystems 124f-j are provided to ventilate the composting material in bay sections 14a-e respectively. Analogously, ventilation subsystems 124k-o are provided to ventilate the composting material in bay sections 16a-e respectively; and ventilation subsystems 124p-t are provided to ventilate the compost and bay sections 20a-e respectively.

Figure 6:
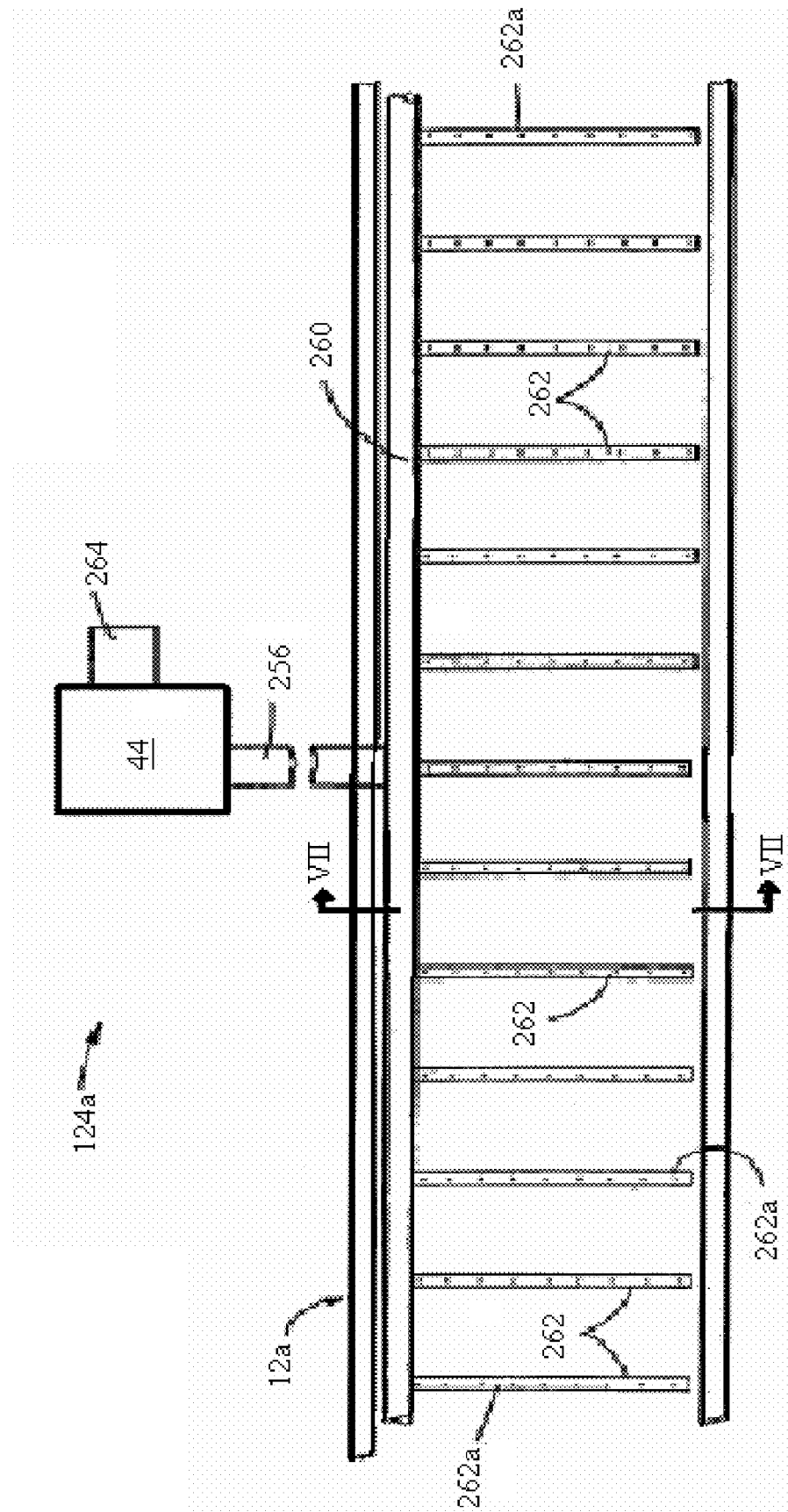
FIG. 6 is an enlarged plan view of a portion of one bay of the composting facility of FIG. 5, and in particular, showing a portion of the ventilation system of the facility.
Figure 8:
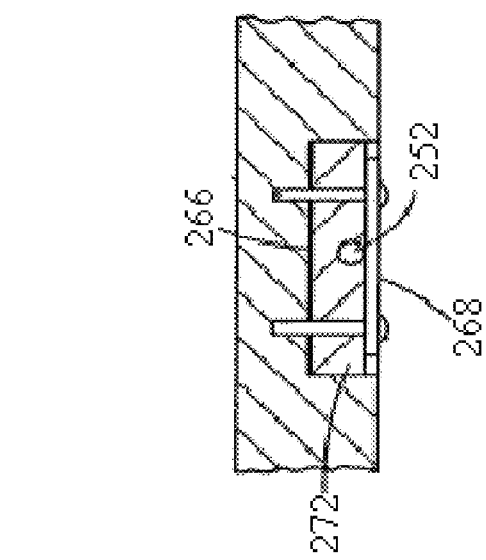
FIG. 8 is a cross-sectional view taken along line VIII-VIII of FIG. 7, and illustrating a thermal sensor recessed in a frame of the composting bay.
Figure 7:
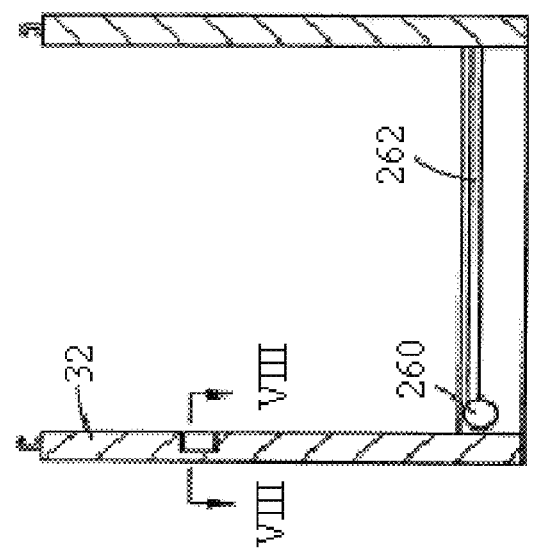
FIG. 7 is a cross-sectional view taken along line VII-VII of FIG. 6, and also showing details of the ventilation system.

The ventilation subsystems 124a-t are similar to each other; and only one, subsystem 124a, will be described in detail herein. With particular reference to FIGS. 6-8, subsystem 124a includes blower 44, feed line 256, header 260, a multitude of distribution lines 262, and at least one sensor 252. Blower 44 is employed to selectively supply a source of air; and in particular, blower 44 has an actuated state, wherein it operates to provide the source of air, and an unactuated state, wherein the blower is not operating. In some embodiments, blower 44 includes a motor 264 that is used to operate or drive the blower; and motor 264 is actuated and deactivated, respectively, to actuate and deactuate blower 44. Any suitable fan blower, including any suitable motor, may be used in ventilation system 124a. In some embodiments, blower motor 264 is an electrically operated motor.

Feed line 256 is connected to blower 254 to receive air therefrom; and feed line 256 extends from blower 254 into bay section 12a, specifically, into the floor thereof. Header 260 is located in bay section 12a and is connected to feed line 256 to receive air therefrom. In some embodiments, header 260 is located within the floor of bay section 12a and extends parallel to the longitudinal axis of the bay, along or closely adjacent side wall 32, and line 256 is connected to header 260 about midway between the ends of the header. Distribution lines 262 are connected to header 260 to receive air therefrom, and the distribution lines extend from the header across bay section 12a. Each distribution line has a multitude of top outlets 262a in communication with the interior of bay section 12a to discharge air thereinto from the distribution line. In some embodiments, distribution lines 262 are parallel to each other, laterally extend across bay 12 and are uniformly spaced apart along the entire length of bay section 12a.

When blower 44 is activated, the blower forces air into feed line 256, and the air is then conducted through that line and into and through header 260. Header 260 conducts the air to distribution lines 262, and air is discharged from these lines into the composting material in bay section 12a via outlets 262a. In some embodiments, the top surfaces and outlets of distribution lines 262 are located at or slightly below the top level of the floor of bay section 12a. Moreover, in some embodiments, the size of outlets 262a are relatively small to prevent gravel and other debris from falling into lines 262 through these outlets.

Temperature sensor 252 of ventilation subsystem 124a is located in bay section 12a to sense the temperature of composting material therein and to actuate ventilation subsystem 124a to conduct air into the composting material when the temperature thereof rises above a preset value, or in some embodiments, when the temperature falls below a preset value. In some embodiments, as shown in FIGS. 7 and 8, the frame of bay 12, specifically, side wall 32 thereof, defines a recess 266 extending outwardly from the interior of the bay, and sensor 252 is located in that recess. With this arrangement, plate 268 is releasably connected to the frame of bay 12, specifically, side wall 32 thereof, to hold sensor 252 in recess 266 and to keep composting material out of that recess. To help insure that sensor 252 is in good thermal communication with the compost in bay section 12a, plate 268 may be made of a material having good thermal conductivity and the sensor 252 may be held against and securely connected to that plate. Furthermore, recess 266 may be filled with a thermally insulating material 272 to help insulate sensor 252 from heat generated outside of composting bay 12, and plate 268 may not touch side wall 32 to inhibit the transfer of heat therefrom to sensor 252 via plate 268.

Figure 9:
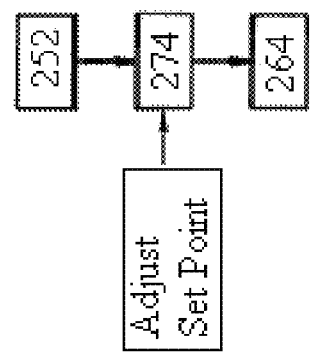
FIG. 9 is a schematic drawing of a control circuit of the ventilation system of FIGS. 6-8.

Sensor 252 may be used to control the operation of ventilation subsystems 124a in any suitable way, and FIG. 9 is a schematic diagram showing one such control arrangement. Sensor 252 may comprise a thermocouple which produces an electric output current having a magnitude dependent on the temperature of the sensor. Sensor 252 is in some embodiments electrically coupled to a control member 274, which compares current output from the sensor 252 to a set point value. When the magnitude of the current from sensor 252 rises above that set point (or in some embodiments, drops below that set point), control member 274 generates a control signal that is conducted to and actuates fan blower motor 264, and this motor operates fan 44 to provide air to bay section 12a. In some embodiments, the above-mentioned set point value is manually adjustable, or adjustable remotely through an external control system, allowing an operator to vary the temperature of the compost in bay section 12a at which ventilation subsystem 124a is actuated. Moreover, control member 274 in some embodiments comprises a microprocessor programmed to receive input data from sensor 252 and manual or remote input to adjust the set point value, and to actuate motor 264 when the temperature of the sensor rises above (or in some embodiment, drops below) that set point value.

With reference to FIG. 5, in some embodiments the feeder line of each ventilation subsystem enters the respective bay section about midway along the length of that bay section, and the feeder lines to the "a," "b," "c," "d," and "e" sections of interior bays 14 and 16 pass below the feeder lines to the corresponding sections of outside bays 12 and 20. Thus, for instance, the feeder line to bay section 14a extends parallel to and approximately directly below the feeder line to bay section 12a.

As previously mentioned, the subsystems 124a-t are generally very similar. However, in some embodiments, the temperature of the composting material in each composting bay is allowed to vary along the longitudinal direction of the bay (for example, from one section "a," "b," "c," "d," or "e" to the next), and thus the sensors of the different ventilation subsystems actuate those subsystems at various temperatures. Also, the set point of each sensor 252 can be independently manually or remotely adjusted, and in some embodiments, all of the ventilation subsystems 124a-t employ a common controller 274 to receive the input signals from the various sensors of the ventilation subsystems and to actuate the fan motors thereof.

The preferred temperature variation of the composting material in each bay depends on a number of factors, such as the moisture content of the composting material and the type of organic waste in the composting material. By controlling the temperature and aeration of the composting material, microbial activity during the composting process can be increased to decrease the time required to produce the desired end product. In some embodiments, systems may also be provided for introducing moisture into the composting material. The introduction of moisture may help to increase biological activity of microorganisms in composting material to increase the temperature thereof in instances where the composting material had dried to a degree sufficient to suppress the activity of the microorganisms. For example, under certain conditions, it may be preferred to maintain the temperature of the composting material in the first, second, third, fourth and fifth section of each composting bay, respectively, at 40° C., 56° C., 56° C., 45° C., and 40° C.

As will be appreciated by those of ordinary skill in the art, it is not necessary that composting facility 10 include four composting bays, and the system may be provided with one or more bays, for example, eight bays or more. Further, the specific dimensions of the composting bays are not critical, although in one embodiment, each composting bay is approximately 180 feet long and the interior of the bay is about five and one-half feet deep and five and one-half feet wide. Likewise, it is not necessary that five ventilation subsystems be used to ventilate the composting material in each bay, and one or more ventilation subsystems may be used with each bay. The specific number of ventilation subsystems used with a particular bay is determined principally by the extent to which it is desired to exercise control over the temperature of the composting material along the length of the composting bay.

Moreover, it is not necessary that each ventilation subsystem be provided with its own blower, and a single blower may be used to provide air for a plurality, or for all, of the ventilation subsystems. For instance, one common blower may be used to provide air for ventilation subsystems 124a-e. If this is done, valves may be located in that common blower or in the feed lines of the ventilation subsystems 124a-e to control air flow through those subsystems, and in particular so that air may be directed into each of the bay sections 12a, b, c, d, and e independent of whether air is also being conducted into any other of the bay sections.

Figure 10:
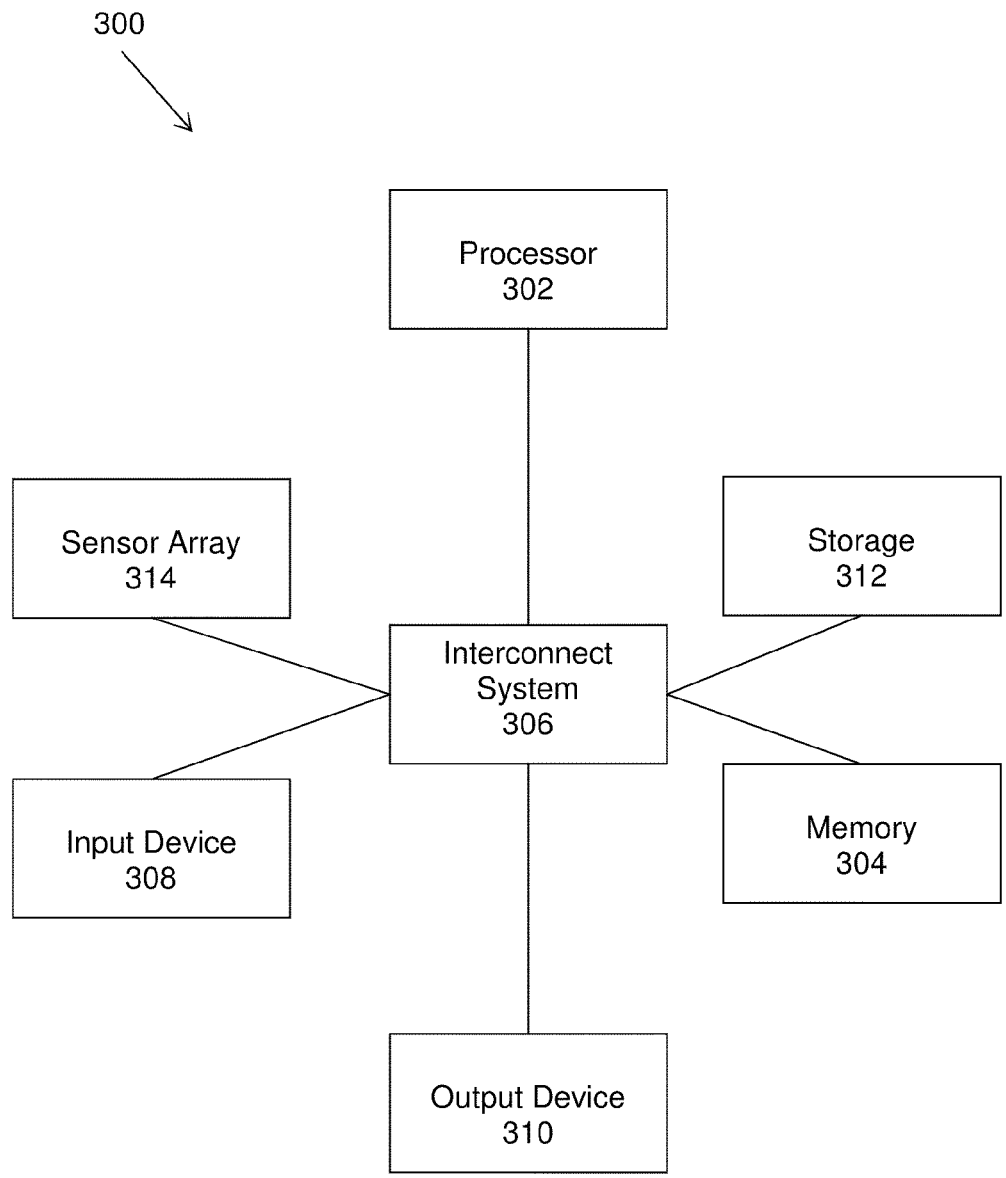
FIG. 10 illustrates a computerized control system upon which one or more embodiments of the present disclosure may be practiced.

A computerized controller 274 for embodiments of the composting system disclosed herein may be implemented using one or more computer systems 300 as exemplarily shown in FIG. 10. Computer system 300 may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended specifically for composting systems.

Computer system 300 can include one or more processors 302 typically connected to one or more memory devices 304, which can comprise, for example, any one or more of a disk drive memory, a flash memory device, a RAM memory device, or other device for storing data. Memory 304 is typically used for storing programs and data during operation of the controller 274 and/or computer system 300. For example, memory 304 may be used for storing historical data relating to the parameters of the composting matter or composting process over a period of time, as well as current sensor measurement data. Software, including programming code that implements embodiments of the invention, can be stored on a computer readable and/or writeable nonvolatile recording medium (discussed further with respect to FIG. 11), and then typically copied into memory 304 wherein it can then be executed by processor 302. Such programming code may be written in any of a plurality of programming languages, for example, Java, Visual Basic, C, C#, or C++, Fortran, Pascal, Eiffel, Basic, COBAL, or any of a variety of combinations thereof.

Components of computer system 300 may be coupled by an interconnection mechanism 306, which may include one or more busses (e.g., between components that are integrated within a same device) and/or a network (e.g., between components that reside on separate discrete devices). The interconnection mechanism typically enables communications (e.g., data, instructions) to be exchanged between components of system 300.

Computer system 300 can also include one or more input devices 308, for example, a keyboard, mouse, trackball, microphone, touch screen, and one or more output devices 310, for example, a printing device, display screen, or speaker. Computer system may be linked, electronically or otherwise, to a sensor array 314, which may comprise, for example one or more of sensors 252, 254, one or more humidity sensors in the composting facility, and/or any other sensors utilized in the embodiments of the composting system disclosed herein. In addition, computer system 300 may contain one or more interfaces (not shown) that can connect computer system 300 to a communication network (in addition or as an alternative to the network that may be formed by one or more of the components of system 300).

According to one or more embodiments, the one or more output devices 310 may include one or more components, such as ventilation blowers 40-44, agitator 48, shuttle 36, compost conveyor systems (not shown), ventilation fans (not shown), and/or water pumps configured to introduce moisture into the composting bays (not shown) associated with embodiments of the composting system disclosed herein. Alternatively, the sensors 252, 254, ventilation blowers 40-44, agitation device 48, shuttle 36, compost conveyor systems, water pumps, or any or all of these components may be connected to a communication network that is operatively coupled to computer system 300. For example, sensors 252 and 254 may be configured as input devices that are directly connected to computer system 300, ventilation blowers 40-44 and/or agitation device 48 may be configured as output devices that are connected to computer system 300, and any one or more of the above may be coupled to another computer system or component so as to communicate with computer system 300 over a communication network. Such a configuration permits one sensor to be located at a significant distance from another sensor or allow any sensor to be located at a significant distance from any subsystem and/or the controller, while still providing data therebetween.

Figure 11:
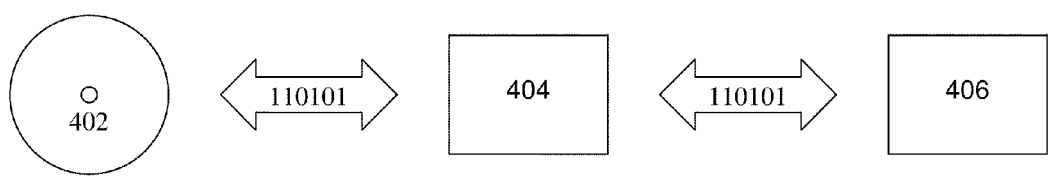
FIG. 11 illustrates a storage system that may be used with the computerized control system of FIG. 10 in accordance with one or more embodiments of the present disclosure.

As exemplarily shown in FIG. 11, controller 300 can include one or more computer storage media such as readable and/or writeable nonvolatile recording medium 402 in which signals can be stored that define a program to be executed by one or more processors 406 (such as processor 302). Medium 402 may, for example, be a disk or flash memory. In typical operation, processor 406 can cause data, such as code that implements one or more embodiments of the invention, to be read from storage medium 402 into a memory 404 that allows for faster access to the information by the one or more processors than does medium 402. Memory 404 is typically a volatile, random access memory such as a dynamic random access memory (DRAM) or static memory (SRAM) or other suitable devices that facilitates information transfer to and from processor 406.

Although computer system 300 is shown by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the control system may be implemented in software, hardware or firmware, or any combination thereof. For example, one or more segments of an algorithm executable by controller 274 can be performed in separate computers, which in turn, can be in communication through one or more networks.

Figure 12:
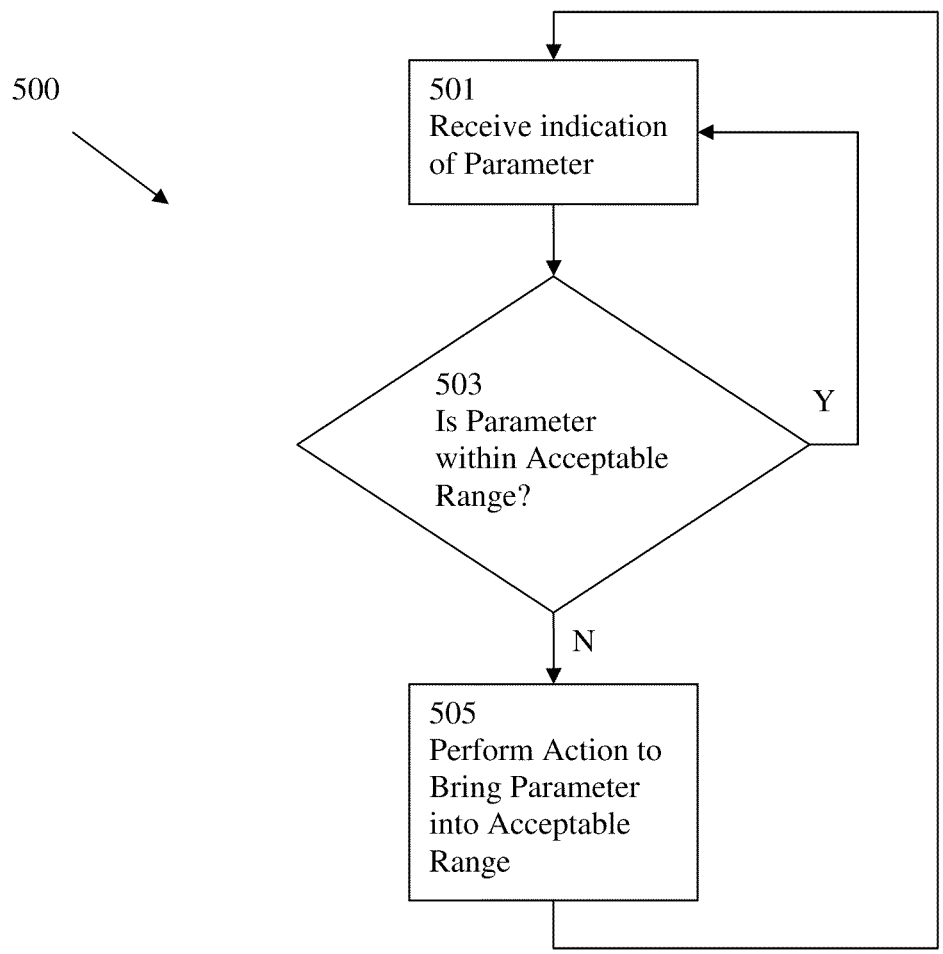
FIG. 12 is a control algorithm for control of parameters related to methods in accordance with one or more embodiments of the present disclosure.

A control algorithm 500 that is executed by some embodiments of controller 274 and/or computer system 300 is schematically illustrated in FIG. 12. In step 501 of this control algorithm, a signal from a sensor which includes an indication of a level or state of a parameter of interest is received by the controller 274 and/or computer system 300. For example, a signal including an indication of a temperature may be received from a temperature sensor 252, a signal including an indication of a position of an agitator may be received from a position sensor 254, or a signal including an indication of a level of humidity may be received from a humidity sensor. In some embodiments, additional or alternative sensors which may provide an indication of a level or status of other types of parameters to the controller 274 and/or computer system 300 may also be present in the composting system. For example, in some embodiments, chemical sensors which measure the concentration of one or more chemicals or elements in the air in the composting facility or within the composting material or finished compost may be utilized. Further, one or more moisture sensors or moisture measurement systems may be provided which may provide an indication of a moisture level in the composting material, incoming sludge, or finished compost. In some embodiments, these chemical and/or moisture sensors may be located within the composting facility and may perform instantaneous or near instantaneous measurements of the a concentration of one or more chemicals or elements, or in some embodiments, continuous measurements, while in other embodiments, the sensors may be located outside the composting facility and may periodically be provided with samples of air, composting material, or compost for analysis. The indication of the parameter received at step 501 is compared against a set point and/or against an acceptable range for the parameter in step 503 of the algorithm. If the parameter is within an acceptable range, no action is taken, and the algorithm returns to step 501. If the parameter is not within an acceptable range, in step 505 of the algorithm, an action may be initiated to bring the parameter into an acceptable range. For example, if a temperature sensor 252 indicates to the controller 257 or computer system 300 that a temperature of composting material within a composting bay is at a level which is outside an acceptable range, for example above a predefined set point, the controller 257 or computer system 300 may initiate an action resulting in the activation of an aeration blower or an agitator. The action may be initiated directly by the controller 257 or computer system 300, or in some embodiments, the controller 257 or computer system 300 may provide an output prompting an operator to initiate the action. In another example, if a chemical sensor indicates that a chemical concentration, for example a level of a metal within the compost or composting material is unacceptably high, a warning may be issued to an operator, who may perform an action, such as altering the mix of materials entering the composting bay producing the unacceptably high level of metals in the composting material or finished compost.

Composting systems may be supplemented by an odor control systems, for example, the LO/PRO® odor control system available from Siemens Water Technologies Corp. (Warrendale, Pa., USA). These odor control systems may in some embodiments include chemical scrubbers. Biofilters may also be provided in some embodiments. The provision of odor control systems is sometimes desirable because composting systems often generate various odors as a byproduct of the biological breakdown of the composting material. The public's reaction to unpleasant composting odors may often be severe. The public is interested, sometimes aggressively so, in odors which assault their sense of appropriate smells. Thus, the reduction of composting odors may be a desirable goal in some composting facilities.

In contrast, operators of composting facilities are interested in odors of composting as an indication of the microbiology within the composting materials. These odors may suggest how operational parameters may be affecting those microbiological processes. For example, if odors characteristic of volatile acids and reduced sulfur compounds are detected, this may be an indication that a composting bed of material is not receiving sufficient aeration or agitation, and contains areas where anaerobic microbial digestion of the composting material is taking place. In contrast, ammonia odors may dominate in an aerobically composting material bed.

Chemical characteristics associated with odors of composting materials are related to, for example, aerobic conditions within the composting material, the carbon to nitrogen balance (the C:N ratio) of the composting material, oxygen transfer (related to porosity), pH of the composting material, and to some extent, the chemical composition of the materials being composted.

Furthermore, some wastes contain sulfur compounds which, during composting in a deficiency of oxygen, generate odors of reduced sulfur compounds. Food waste or garbage tends to have sour odors due to the volatile organic acids generated during collection and handling prior to composting. Odors of composting sewage sludge are likewise characteristic, and well-aerated systems smell quite different from poorly aerated systems.

Physical conditions such as age and temperature of composting material can also impact odors. These odors change depending on the length of composting time and the extent to which the readily biodegradable materials have biodegraded. In some composting operations, during the initial week to ten days of composting, odors can be unpleasant. Subsequently, the composting material contains less biodegradable materials. The composting microbiology has been transformed to include a greater variety of microbes. Odors tend to be more soil-like.

Temperature of the composting material affects odors. Odors are basically volatile liquids; they can evaporate. Some volatile liquids have objectionable odors. As the temperature of the composting material rises, these liquids evaporate more readily and are released into the atmosphere. Hot composting material will have a different odor than cold composting material.

Figure 13:
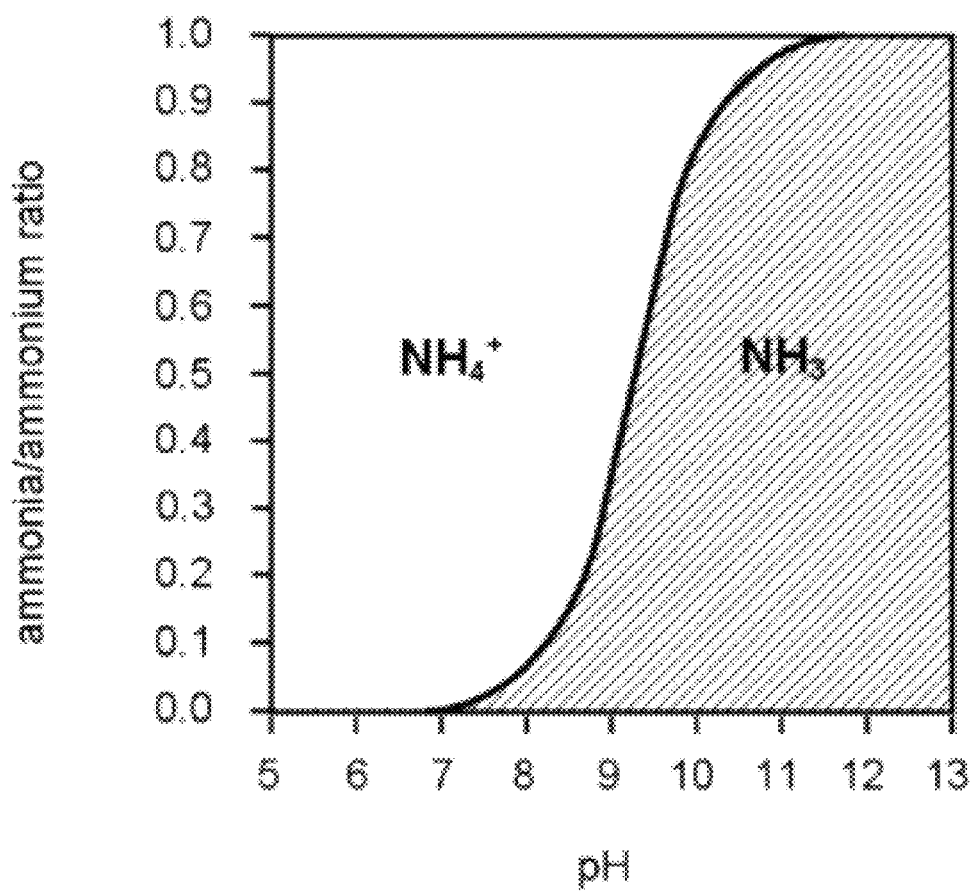
FIG. 13 is a chart illustrating the effect of pH on the thermodynamically stable ratio of ammonia to ammonium.

It has been discovered that maintaining a relatively low pH of the composting material facilitates the reduction in the formation of malodorous ammonia gas from nitrogen compounds within the composting material pile. The pH of the composting material pile varies according to the pH of the starting material used to form the composting material pile, as well as the pH of the byproducts of the composting process. As the pH drops (becomes more acidic), the volatile ammonia ($NH_3$) becomes protonated as ammonium ($NH_4^+$), the nonvolatile odorless salt form of the chemical, as shown in FIG. 13. Thus, a composting material mix with a low pH should exhibit less odors due to the release of ammonia during the composting process than a composting material mix having a higher pH.

Figure 14:
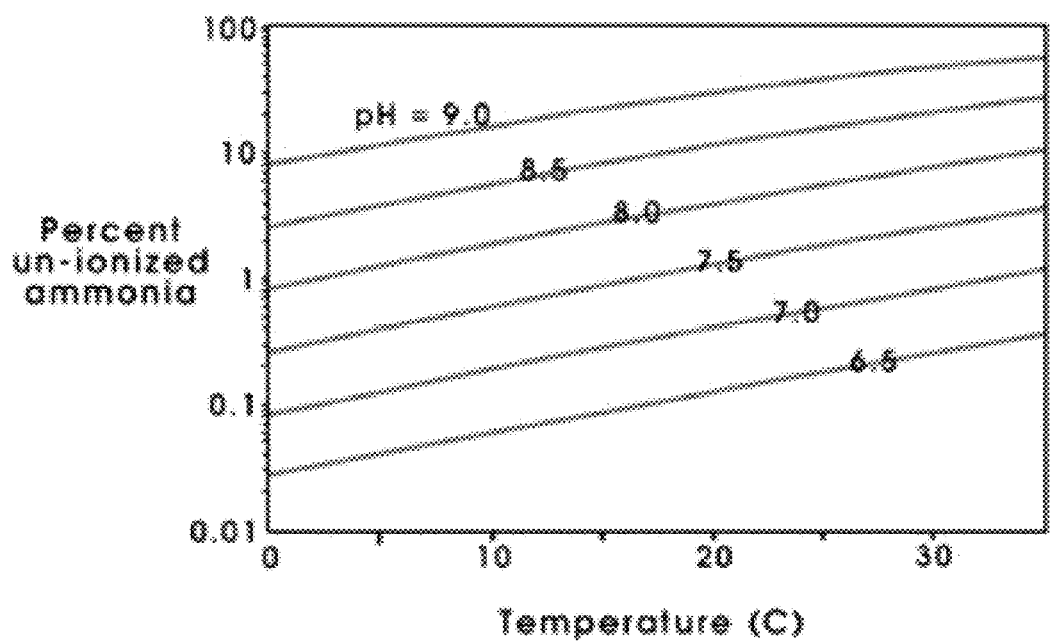
FIG. 14 is a chart illustrating the effect pH and temperature on the thermodynamically stable ratio of ammonia to ammonium.

As noted earlier, the temperature of the composting material affects odor, but will also change the proportion of ammonia (in un-ionized form) to ammonium. As temperatures increase, the proportion in the volatile ammonia form increases, as illustrated in FIG. 14. At any given temperature a lower pH would be required to suppress the creation of volatile ammonia ($NH_3$) from ammonium ($NH_4^+$).

Conventional composting operations typically add a structural amendment such as wood chips, sawdust, or other traditional amendment materials to an organic material to be composted to increase the carbon concentration and to add porosity to the compost mix. Commercial composting operations have not previously been run without the addition of some form of structural amendment to the organic compostable material because the absence of a structural amendment tends to cause the compost mix to be heavy and dense, possess a high viscosity, and have low porosity. These properties render the composting material difficult to properly agitate and aerate to maintain the biochemical processes to form a proper compost end product. Further, in composting material mixes formed without some type of structural amendment, especially in composting material mixes containing sludge from, for example, a municipal wastewater treatment plant, it has been observed that sludge tends to build up on the conveyor flights and other surfaces of the agitator. Low porosity of a composting material mix makes uniform aeration nearly impossible, resulting in anaerobic spots, formation of malodorous volatile acids, poor composting, and little drying. The denser a composting material mixture is, the more difficult it is for a mechanical agitator to process it.

More power is required by an agitator to process a dense composting material mix than a less dense mix. Also, composting material build-up on the agitator due to stickiness can increase power requirements, slow the agitator processing speed and capacity, and increase operator maintenance for cleaning the surfaces. Density and stickiness of a composting material mix are inversely related to the dry solids content of the mix. Thus, standard design recommendations for composting sludge suggest boundary conditions for minimum dry solids in the to-be-composted composting material mix which may vary by season.

While these boundary conditions for the starting composting material mix are related primarily to the thermodynamic properties of the mix, stickiness is also a concern. In general, an amendment used in the composting material mix helps reduce stickiness by increasing friability and structure of the mix.

It has been discovered that it is possible to effectively treat dewatered municipal wastewater treatment plant (MWWTP) sewage sludge (also referred to herein as biosolids, sludge biosolids, sludge cake, sludge, or cake) by composting (also referred to herein as biodrying) without the need for traditional amendment materials to be added to the undigested sludge prior to the composting operation. It was discovered that either dried undigested (i.e., non-composted) sludge or processed compost material produced from the composting procedure itself could both be used in place of traditional amendment materials for the composting process to form a mixed sludge suitable for composting. It was found that traditional amendment materials were not necessary to mix with the mixed sludge to form a suitable composting mix. Rather, the material added to the influent biosolid sludge could consist of 100% recycled compost or 100% dried undigested biosolid sludge and still form a mix which composted adequately. A process using 100% recycled compost to mix with undigested influent biosolid sludge prior to composting utilizes no bulking agent or amendment other than material produced by the composting process itself, could be considered an "amendment-free" composting process. Composting mixes using dried undigested sludge or compost as substitutes for traditional amendment materials were found to be capable of being composted to achieve desired levels of heating and drying without undue stickiness or the formation of a significant amount of objectionable odors.

During the initial startup of a composting operation, there may be no processed compost available for mixing with incoming undigested sludge. Thus, for initial startup of a composting operation or facility, dried undigested sludge could be used for mixing with incoming dewatered sludge prior to introduction into the composting bay. In some embodiments involving sludge derived from MWWTPs, the dried solids content of the dewatered undigested sludge may be about 20%. The dry solids content of dried undigested sludge is in some embodiments from about 50% to about 99%. The skilled artisan will recognize that the dry solids content of the dewatered sludge would vary depending upon the dewetting process, and could be adjusted to various levels as desired. The proportion of dried and dewatered undigested sludge mixed could be selected to form a compostable mixture (a mixed sludge) of a desired dry solids content, for example, in some embodiments, between 30%-45% dry solids. In some embodiments, traditional amendment material could also be mixed with the influent dewatered undigested sludge prior to (or in other embodiments, concurrent with or after) introduction into the composting bay.

The carbon to nitrogen ratio of the dried and dewatered undigested sludge mix may, in some embodiments utilizing sludge derived from MWWTPs, be less than 15:1 by weight, for example, between about 8:1 and about 15:1 by weight. One skilled in the art would appreciate that it might occasionally be desirable to make adjustments to the process for certain purposes that might bring the C:N ratio of the mixed sludge out of this range. This carbon to nitrogen ratio may be adjusted to a higher level if traditional woody or cellulosic types of amendment materials are also added to the sludge mixture.

For the reasons described above, the pH of the dried undigested sludge and dewatered sludge mixture may in some embodiments be acidic, in some embodiments in a range of between about 5.0 and about 7.0. In other embodiments, the pH may be as high as about 9.0, although substantial odors may be generated when composting a mixed sludge with a pH at this level.

The mixture of dried and dewatered undigested sludge could be composted in a composting system as described above to form a finished compost. Parameters such as aeration timing and volume and agitation speed or frequency could be adjusted during the composting operation as described above to achieve a desired level of dry solids in the finished compost material, for example, in some embodiments, between about 50% and 100% dry solids. This finished compost would in some embodiments be used to mix with additional influent dewatered undigested sludge to form a compostable mix (a mixed sludge) without the addition of any other bulking materials, carbon sources, or other forms of amendment.

In methods where traditional amendment material was mixed with incoming dewatered undigested sludge biosolids during startup of the composting process to provide bulking agents and a rich source of carbon, this traditional amendment material would be at least partially digested during the composting process. During subsequent runs of the composting operation, recycled finished compost would in some embodiments be used as the sole material mixed with incoming dewatered undigested sludge biosolids introduced into the composting bays. This process would result in the eventual microbial digestion of all of the traditional amendment material used during the composting operation startup phase as more dewatered undigested sludge biosolids were composted and recycled. The operation would then rely on only finished compost for mixing with incoming dewatered undigested sludge biosolids to form a composting mix for composting in the composting bays, resulting in an "amendment-free" composting process.

The amount of finished compost that is recycled to be mixed with incoming dewatered sludge biosolids may vary depending upon the amount of dry solids in the dewatered sludge biosolids and in the finished compost and in the amount of dry solids desired in the mixed sludge to be composted. The amount of dry solids in the incoming dewatered sludge biosolids and in the finished compost may be measured or monitored by one of the methods described above. In some embodiments, more than about 50% of the finished compost would be recycled. Finished compost which is not recycled may be used in some embodiments for agricultural fertilizer, in other embodiments be incinerated or used for combustible fuel, for example, as an additive to coal used in coal fired power plants. In further embodiments, the non-recycled compost may be disposed of in a landfill or by other means. Embodiments of the present disclosure provide advantages to the landfill disposal of sewage sludge in that because the moisture level of the sewage sludge is decreased, the volume of sludge for disposal also is decreased, which results in less landfill area required for the disposal of the sludge. The non-recycled compost could also be used as a soil blended material suitable for use in landfill daily cover or closure operations.

Figure 15:
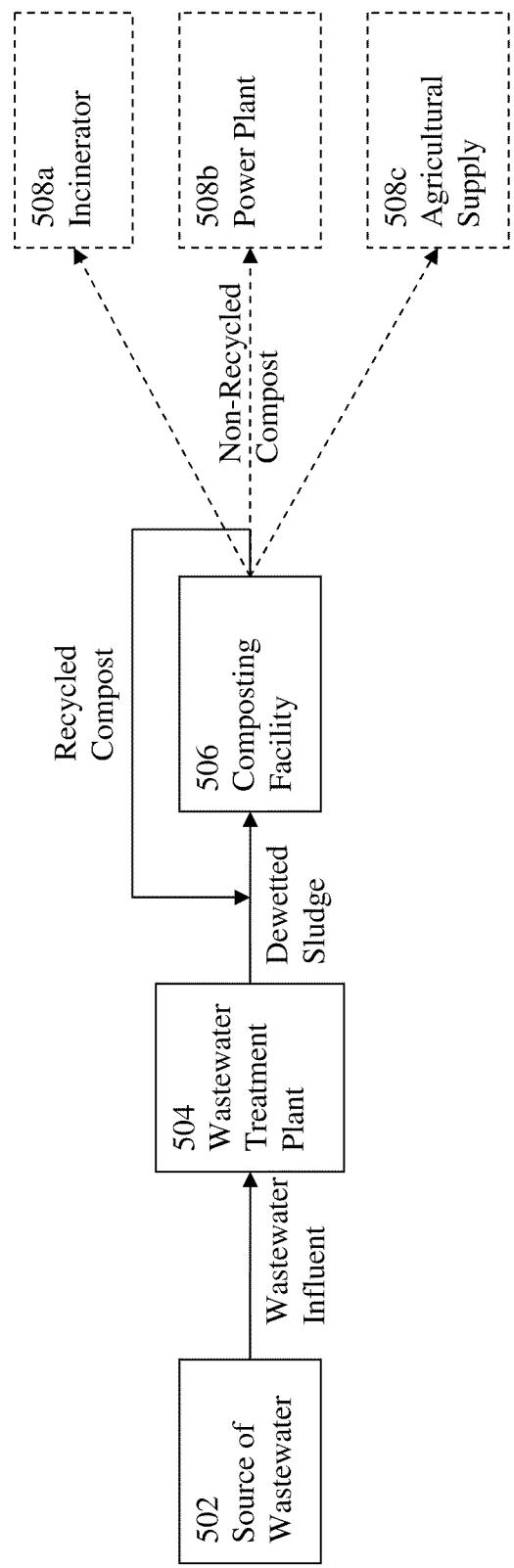
FIG. 15 is a schematic diagram of a process in accordance with an embodiment of the present disclosure.

An example of an overall process in accordance with the present disclosure is illustrated in FIG. 15. As illustrated in FIG. 15, a source of wastewater 502, for example, a municipal sewage system, provides wastewater influent to a wastewater treatment plant 504. The wastewater influent would contain a low amount of solids, in some embodiments about 2% solids. At the wastewater treatment plant 504, the influent wastewater is dewatered using, for example, a belt filter press, centrifuge, hydrocyclone, or the like to form a dewatered sludge. The dewatered sludge is transported to a composting facility 506, which in some embodiments may be proximate or form a part of the wastewater treatment plant 504, and in other embodiments may be located at a distance from the wastewater treatment plant 504. In the composting facility, the dewatered sludge is mixed with, for example, finished compost produced by previously composted material to form a mixed sludge, and is introduced into, for example, composting bays in the composting facility to be processed to form a finished compost. A portion of this finished compost is recycled for mixing with additional incoming dewatered sludge. Compost which is not used for mixing with incoming dewatered sludge may be disposed of in a variety of ways, including, for example, incineration 508a, use as a fuel in a power plant 508b, or used as a soil amendment for agricultural purposes 508c. Excess compost could also be buried in a landfill if desired.

The amount of volatile solids present in the composting mix would be dependent upon the amount of volatile solids in the influent dewatered sludge, the amount of volatile solids in the material, for example, the dried undigested sludge or recycled compost, mixed with the influent dewatered sludge prior to composting, and the ratio of these components mixed together. The amount of volatile solids in a mixed sludge produced from the mixture of the influent dewatered sludge and the dried undigested sludge or recycled compost could be adjusted to a level to promote a desired level of microbial digestive activity that would provide sufficient heat to result in a desired level of dryness in the finished compost. In some embodiments, a compostable mix would be formed by influent dewatered sludge and dried undigested sludge mixed together in a ratio of between about 2:1 and 4:1 by volume and 1:1 to 2:1 by weight, depending on the moisture content of the dewatered and the dried sludges. In other embodiments, a compostable mix would be formed by influent dewatered sludge and recycled compost mixed together in a ratio of between about 2:1 and 1:2 by weight.

In some embodiments, any or all of the influent dewatered sludge, the dried undigested sludge, the mixed sludge, and the recycled compost would have a volatile solids content of between about 60% and about 95% depending, for example upon the makeup of the wastewater stream influent to the MWWTP.

Finished compost may be transported to a mixing area for mixing with influent dewatered sludge biosolids in any of a number of ways. For example, in one embodiment, recycled compost may be transported to a mixing area manually or with the assistance of standard earth moving equipment such as backhoes, bulldozers or other conventional means. In further embodiments, an automated conveyor belt system is utilized to transport finished compost from a discharge area at the end of one or more compost bays to the mixing area.

Mixing of the finished compost and the incoming dewatered sludge biosolids may be accomplished in a number of ways. In one embodiment, the finished compost and the incoming dewatered sludge biosolids are manually mixed in the mixing area using, for example a skid steer loader or other conventional means. In another embodiment, a mechanized commercial mixer, such as an auger, is used. In a further embodiment, the incoming dewatered sludge biosolids and the recycled finished compost are introduced separately into a first portion of a composting bay, and are mixed by the action of a mechanical agitator as described above which travels along the composting bay to agitate the composting material.

In some embodiments, the finished compost is screened prior to being recycled for mixing with incoming dewatered sludge biosolids. For example, the smaller particles in the finished compost may be removed by screening until a desired amount of finished compost for recycling is attained. This may result in providing a compost material having an average particle size that is larger than the average particle size of the finished compost prior to screening to be used for recycled mixing with incoming dewatered sludge biosolids. A benefit of providing larger particles of finished compost for recycling is that the recycled compost/dewatered sludge biosolid mix may have a greater porosity than if the recycled compost were not screened prior to recycling. As described above, greater porosity (lower density) of the composting mix is often beneficial in that it is easier to agitate and/or aerate a more porous composting material mix versus a composting material mix with less porosity.

Examples of methods and materials which may be utilized in accordance with the above disclosure will now be described by way of the following example.

EXAMPLE

In the following Example, a two phase test was performed to evaluate composting (biodrying) in accordance with methods disclosed above. The test took place at a composting facility having four bays, each 67 meters (220 feet) long, 2 meters (6.6 feet) wide and 1.83 meters (6 feet) deep. At the end of the bays was a common discharge pit into which material would fall when exiting each of the bays. Each bay had five independent aeration zones (A-E) and each aeration zone had a dedicated blower and wall-mounted thermocouple. The thermocouples were used for process monitoring. The blowers were controlled in timer mode. The facility was equipped with an IPS™ 30 HP Narrow Bay agitator similar to that described in the disclosure above.

The phases of this Example described below were completed in a location at a time of year where temperatures averaged 21° C. (70° F.), with highs at about 26° C. (79° F.) during a first month and an average temperature of 24° C. (75° F.), and with highs at about 28° C. (83° F.) during a second month.

Phase 1

Phase 1 of testing replicated conditions that might be present in a new composting facility or a facility which did not have access to finished compost for mixing with influent sludge to form a mixed sludge to be composted. Instead of finished compost, heat-dried undigested sludge was used to mix with influent sludge to form a mixed sludge for composting.

In phase 1, a mechanically enhanced sludge drying trial using MWWTP sewage sludge was conducted. In this trial, undigested MWWTP sludge, which was dewatered on a belt filter press to a solids concentration of about 25% was blended with heat-dried MWWTP sludge pellets to increase the solids content to a target of 40% solids by weight. A goal of the phase 1 testing was to maximize the drying of the mixed sludge by maintaining aeration rates sufficient to hold temperatures in the range of from 25° C. (greater than ambient temperature) to 45° C. During a 24 day composting period, dry solids increased from approximately 43% to 88%. Odors were minimal and not considered to be objectionable. Fecal coliform counts in the dried compost ranged from 19 to 1,100 MPN per gram dry solids and averaged 500 MPN per gram dry solids.

A composting bay was first loaded with five charges of shredded green waste. This material served as an insulating buffer as well as a wall to prevent the mixed sludge from tapering at the discharge end of the bay. Each charge occupied a 3.66 meter (approximately 12 foot) long segment of the bay; this is approximately equal to the distance the material is moved through the composting bay by the agitator with each agitation. Another of the goals of phase 1 of this testing was to assess composting material bed height limitations. The mixed sludge was thus maintained in the composting bay with a bed height as high as possible.

To form the mixed sludge for use in the trial, heat dried undigested sludge pellets (pellets) were mixed with undigested dewatered sludge cake (cake) initially on a concrete pad using a skid steer loader. Mixing of these two physically different materials worked well, though a substantial quantity of pellets remained free and unincorporated into the overall mixture. Both the blended mix and the free pellets were loaded into the charge zone of the bay. Subsequent mixes were prepared using a commercial auger mixer.

The mixed sludge consisted typically of a mix of about 3.5 wet tons of cake (21.7% Dry Solids (DS), 90% Volatile Solids (VS), 4.6% Total Kjeldahl Nitrogen (TKN), pH 5.8, and a carbon to nitrogen ratio (C:N) of 9) blended with 1.2 wet tons of pellets (94.3% DS, 84% VS, 5.7% TKN, pH 6.1. and C:N 8).

On day one, three cake/pellet charges were prepared and loaded into the bay. Two runs of the agitator through the bay were performed after loading these three cake/pellet charges. The center charge of the three was sampled and tested after these two agitations, and had the following properties: 40.3% DS, 86.9% VS, 5.6% TKN, pH 5.4, and C:N 9. On day two, two more cake/pellet charges were loaded into the bay, and two more runs of the agitator through the bay were performed. In all, five charges of this cake/pellet mixture were loaded consecutively into the feed end of the composting bay. These charges were loaded as high as possible in the bay to ensure that the agitator would be subjected to worst case conditions with regard to power demand as well as to determine if there were any biological limits related to pile height.

Additional charges of ground green waste were loaded behind the mixed sludge to maintain pile height and to provide thermal insulation. The inside three cake/pellet mixed sludge charges were deemed the "target" charges and were monitored for chemical changes. These center target charges were considered to be the most representative of mixed sludge that would be composted in an amendment-free biodrying process because the mechanical agitation process tended to blend the outer charges with other materials composting in the bay.

There were two process-related variables controlled during this testing: aeration blower run time and agitation frequency.

Aeration blowers were run with a goal of drying the mixed sludge out to a target of 65% dry solids as quickly as possible. In aeration zones A and B (the first 75 ft or 23 m of the bay), as long as the compost temperature was at least 5° C. greater than the ambient temperature, the aeration blowers were set to run. This was expected to optimize the evaporative moisture loss potential. By day two of the testing, the target charges were able to maintain temperatures of 5° C. above ambient due to the heat generated by the biological breakdown of the composting mixed sludge.

Therefore, the zone A and B blowers were set to run in cycles of 15 minutes on and five minutes off, 24 hours per day. By the time the charges reached the beginning of zone C (at day five), the rate of drying observed made it clear that the material would achieve the 65% solids target value within the next few days.

As it became clear that the initial target of achieving 65% dry solids in the composting mix would be achieved, it was decided to operate the remaining aeration zones C-E in a manner to achieve an additional goal: to optimize compost temperature to try and achieve the PFRP and/or VAR time-temperature standards as set by the United States Environmental Protection Agency. Aeration Blowers C-E (76 ft-220 ft, or 23 m-67 m) were subsequently set to operate at intervals of five minutes on and 30 minutes off.

Agitation of the composting mix was initially performed every other day except Sunday when the facility did not operate. It was expected that operating in this manner would allow maximization of the retention time in the bay to allow the best potential for drying without running the risk of excessive compaction due to lack of turning. After the target solids content of 65% was achieved on day nine, daily agitations were initiated to discharge the target charges as quickly as possible and move on to phase 2 testing.

Multiple charges were sampled and tested nine times during the 25 day composting period.

Phase 1 Results and Discussion

Composting dewatered undigested sludge using heat-dried undigested sludge in place of traditional amendment material was anticipated to manifest serious problems related to odor, stickiness, low porosity, and mechanical challenges. Anticipated problems also included poor drying during the composting process, poor compost quality, and poor heating, resulting in inadequate pathogen kill. The fact that none of these problems occurred during the course of this testing was surprising.

Experience with composting facilities, operations, and materials suggested that handling and composting the sludge mixture would be difficult physically and chemically. The low carbon to nitrogen ratio (C:N) of 9 in the mixed sludge introduced into the composting bay would ordinarily have resulted in voluminous losses of ammonia gas because of an excess of nitrogen relative to biodegradable carbon in the mix. In addition, dewatered sludge cake is ordinarily sticky, non-porous, and difficult to mechanically turn without the addition of traditional amendment material.

A. Physical Properties of the Mix

1. Stickiness:

The sludge mixture displayed a surprisingly low degree of stickiness. Examination of the mixtures in the current study showed that fine, short fibers were present in the mix. It was observed that undigested sewage sludge contains a good deal of paper fines, presumably from toilet tissue, among other sources. Without being bound to a particular theory, it is believed that these fibers may have contributed in a positive way to the low stickiness of the mix. The fibers were too short to bind large particles together, but were long enough to bind small particles together. That is, they contributed positively to the structure of the mix. The fibers also seemed to provide abrasiveness to the mix. This abrasive quality of the observed fibers appeared to clean the agitator tines and conveyor bed of the agitator during agitation, reducing adherence of the mix to the turning components.

2. Porosity:

For the phase 1 testing, the volume ratio of the 94% solids pellets to the 23% solids sludge used to form the mixed sludge for composting was approximately 0.8:1. Porosity of the composting material was maintained by agitation initially twice a day during charging the bay (days one and two), and then every other day throughout the trial period until the 65% solids target dryness was achieved (day 10). Once this target value was achieved, the target charges were agitated daily (with the exception of Sundays) to discharge them from the bay after 24 days. The heat-dried pellets tended to not absorb much moisture and remained recognizable throughout the phase 1 test. However, the pellets did tend to stick on the outside of golf ball size chunks of the cake and to move around freely in the mix. Thus, the pellets enhanced the structure of the composting mix, as well as reducing the stickiness of the mix. Qualitative indications such as low odors suggested aerobic conditions existed within the composting mix.

3. Heat:

The biochemical process produced more than adequate heat to effectively achieve both drying and pathogen kill goals by managing the aeration strategy.

Figure 16:
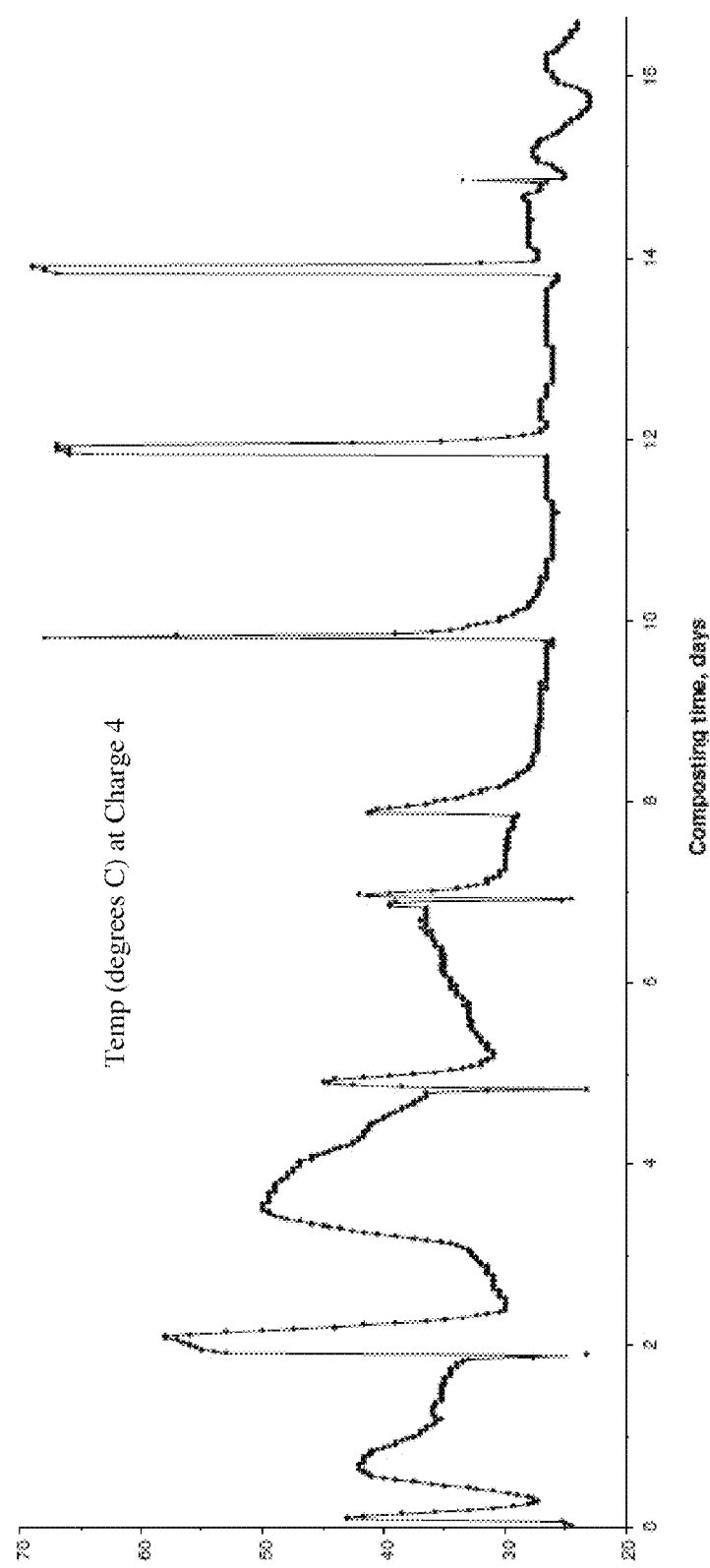
FIG. 16 is a chart of temperature of a composting material vs. time at a position in a charge of material in a composting bed as recorded during a test performed in accordance with an embodiment of the present disclosure.

Regular agitation contributed in very significant ways to maintaining heat output. The graph illustrated in FIG. 16, showing compost temperature as a function of composting time for charge four of the five charges composted during phase 1, illustrates improved heat output (note the temperature spikes) with each agitation. This is due to the fact that the agitation process re-mixes and makes available new food sources for the microbes in the composting sludge mix, re-energizing the composting process.

4. Drying:

Good drying of the compost was achieved during phase 1.

An estimation of net energy expected from volatile solids loss due to the biological activity within the composting mixed sludge during the phase 1 composting process suggested that adequate energy should have been present to evaporate additional water and achieve even higher moisture reduction than what was observed. However, the composting process is driven by biological activity, and the microbes in the composting mixed sludge require water to remain active. As the biodrying process proceeds, microbial activity is slowed. So, drying was limited biochemically by the low moisture content achieved by the composting mix.

Drying was controlled by timed aeration blowers. Air flowing through the compost removed both heat and moisture, as well as supplying oxygen for the aerobic microbes. In addition to the cooling effect of air flowing through the compost, in removing moisture, evaporation of water (an endothermic phase change) removed heat.

For the first part of the phase 1 testing a goal was to achieve optimum drying of the compost mix. A higher degree of aeration is more effective for optimizing drying of the composting mix than for maximizing temperature within the mix. Air flow through the composting mix was thus maximized and the blowers were set to maintain compost temperatures at around 25° C. to 40° C., with aeration activated for approximately 50% of the time when the compost temperature exceeded the ambient temperature by at least 5° C.

Blower run time was decreased during the later composting stages as the composting mixed sludge cooled since the biological decomposition required less oxygen than would have been supplied by the blowers when operated at a rate designed to optimize cooling of the composting mixed sludge.

Figure 17:
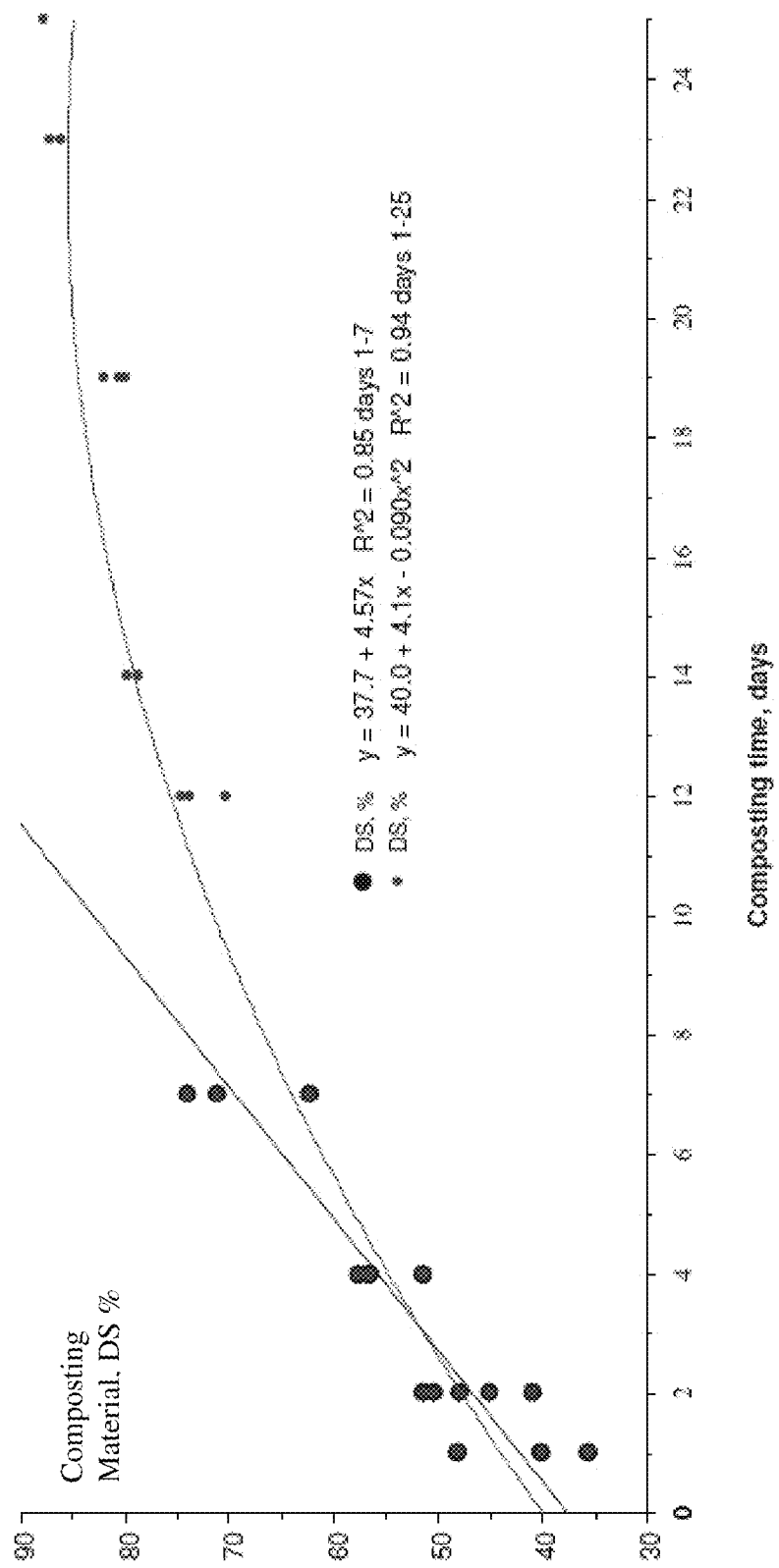
FIG. 17 is a chart of the percent of dry solids in a composting material vs. time in a composting bed as recorded during a test performed in accordance with an embodiment of the present disclosure.

FIG. 17 illustrates the effect of rapid composting (conversion of volatile solids into carbon dioxide, water, and heat) during the first week of composting (days one-seven) on moisture loss and drying. After the first seven days, biological activity decreased as the biodegradable volatile solids were lost. This resulted in a reduced heat output and reduced rate of moisture loss. In this experiment, about 80%

DS was achieved within 14 days, with maximum dryness (about 85% DS) reached in an additional week. This is not to suggest, however, that maximum stability was also achieved. While the compost was adequately stabilized, the composting process would ordinarily be expected to continue for several months at a lower rate as moderated by fungal/bacterial mesophilic processes.

B. Chemical Properties of the Mix

1. Odors:

Odors produced by the composting process in phase 1 were unexceptional. This suggested several things, but the most important was that adequate levels of oxygen were delivered to the composting material to maintain aerobic conditions therein. This indicated that the porosity of the mix was adequate. There was initial concern that the cake-pellet mix would be too sticky, the mix would possess inadequate porosity, and odors indicative of anaerobic biological processes would be apparent. The porosity of the mix was, however, rendered adequate to avoid these concerns for the reasons discussed above.

2. Ammonia.

Ammonia odors during aeration were substantially lower than expected and were unobjectionable. The carbon to nitrogen ratio of the compostable mix was estimated at about C:N=8. Previously accepted assumptions were that a C:N ratio of between 20 to 40 was required for a properly compostable blend of material. Thus, this mix was very rich in nitrogen. It was expected that such a mix would release some of the excess nitrogen as ammonia during the composting process. It is believed that the loss of volatile ammonia was limited by providing a pH less than 7 in the mixed sludge introduced to the composting bay. As pH of a mixed sludge drops, (becomes more acid), volatile ammonia ($NH_3$) becomes protonated as ammonium ($NH_4^+$), the nonvolatile odorless salt form of the chemical, as shown in FIG. 13. As discussed below, the pH of the composting mix was acidic for the initial portion of the testing period, which without being bound to a particular theory, most likely contributed to the minimal amounts of ammonia odors observed.

As noted earlier, the temperature of the composting material affects odor. The temperature of the composting mix will also change the proportion of ammonia (in unionized form) to ammonium in the mix. As temperatures decreases, the proportion of ammonia in the volatile ammonia form decreases, as illustrated in FIG. 14. Thus, as the composting mixed sludge cooled over time, even though the pH increased, as discussed below, the cooling of the composting mixture may have contributed to a reduction in the amount of ammonia gas released.

3. pH.

The combined undigested sludge mix tended to be acidic (with a pH of about 5.5), presumably due to the presence of volatile acids formed during transmission of sewage containing garbage grinder solids as well as other readily biodegradable constituents to the treatment facility. An indication of this was that the dewatered cake possessed a noticeable, sour, vinegary aroma.

Figure 18:
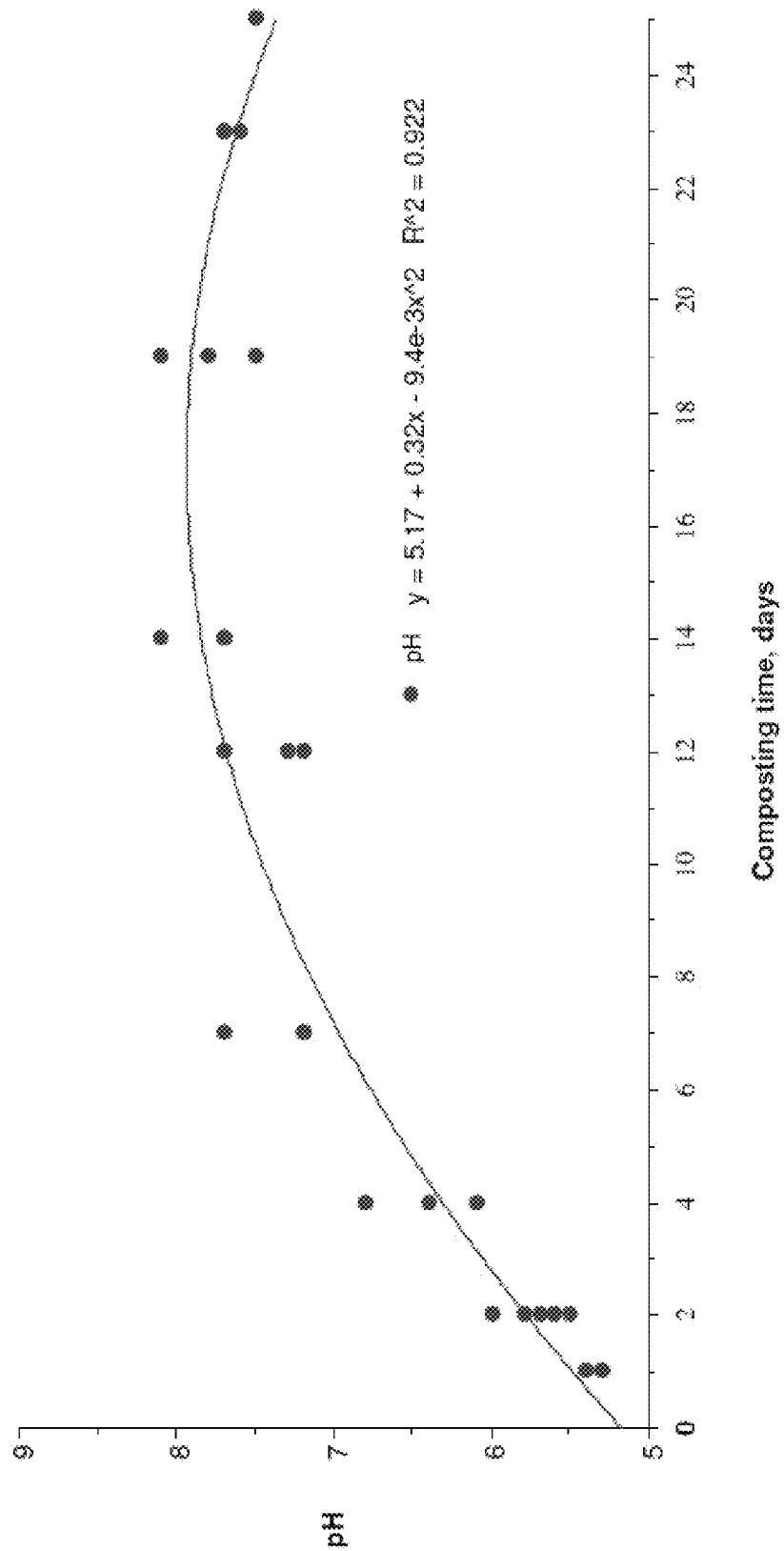
FIG. 18 is a chart of composting material pH vs. time in a composting bed as recorded during a test performed in accordance with an embodiment of the present disclosure.

The pH of the composting material is shown in FIG. 18, a graph of pH as a function of composting time. During Phase 1, the pH of the composting mix remained below seven for the initial week.

Thereafter, the pH increased to 7.5 to 8.0 due to biodegradation of the volatile acids into carbon dioxide and water, subsequently released by aeration and agitation. Even so, the majority of the ammonia remained fixed in the composting mix because at a pH less than eight, ammonia remains stable in the ammonium salt ($NH_4^+$) form. The majority of ammonia released during a composting operation is typically released during the initial rapid composting phase. However, volatile ammonia loss in this test was not exceptional. Ammonia release appeared in fact to be less than in conventional composting operations where traditional amendment materials had been used. The low initial pH apparently contributed to the retention of the ammonia as ammonium. Later in the process when the pH increased, ammonia release was not exceptional as most of the readily biodegradable solids had already biodegraded, and because the composting mixed sludge had cooled, reducing the potential for the volatilization of ammonia.

Figure 19:
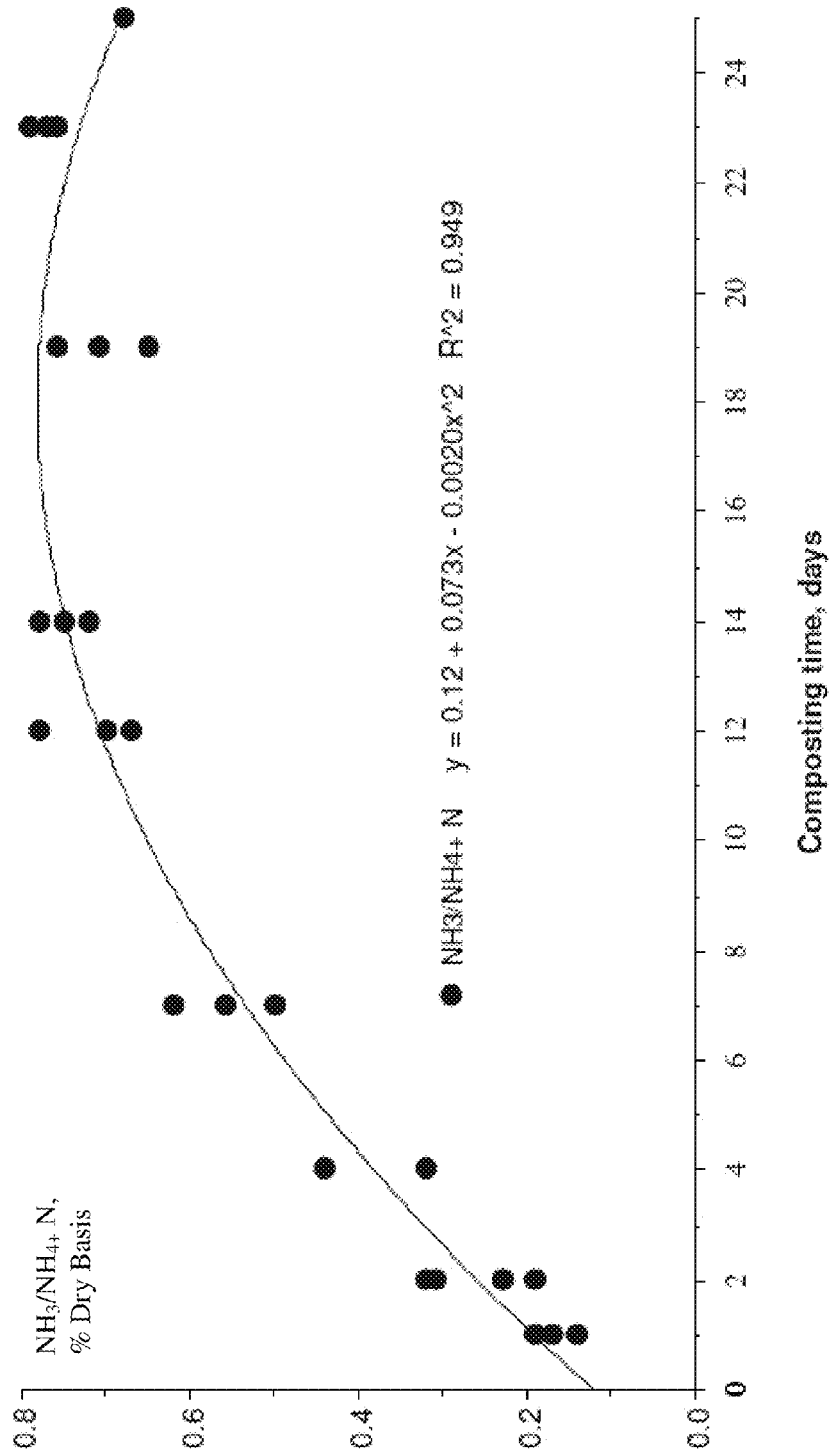
FIG. 19 is a chart of ammonia concentration in a composting material vs. time in a composting bed as recorded during a test performed in accordance with an embodiment of the present disclosure.

Ammonia/ammonium concentration in the composting mixed sludge varied in a chemical pattern similar to pH, as illustrated in FIG. 19, a chart of ammonia/ammonium concentration in the composting mixed sludge as a function of composting time. Typically, in well aerated composting material, pH will be initially lower due to the presence of volatile acids or carbon dioxide formed during the aerobic/facultative composting process. With longer composting time, readily biodegradable volatile solids (including the sour smelling volatile acids) are diminished (biodegraded) substantially and aeration supplied for cooling will remove not only heat but also carbon dioxide. Loss of carbon dioxide, an acidic gas, tends to result in a higher pH in the compost mix.

Phase 2

Phase 2 of testing replicated conditions that might be observed during ongoing operations in an amendment-free composting facility where compost was used in place of traditional amendment materials for mixing with incoming sludge to form a mixed sludge for composting.

In a second phase of the trial, pellets and compost discharged from the compost bay during phase 1 of the trial was blended with dewatered cake to produce a mixed sludge with about 40% solids. Aeration was managed to achieve pathogen killing temperatures as the major objective while also achieving adequate drying. The material was retained in the bay for an average of 18 days. During this retention time, the solids content rose from about 41% to about 68%. Temperatures were maintained in a range of from about 40° C. to at least 55° C. for 13 days, with temperatures exceeding 55° C. for 8 consecutive days; this was more than sufficient time/temperature to meet the United States Environmental Protection Agency requirement for pathogen kill of three days at above 55° C. (PFRP). Consistent with this, the fecal coliform counts in the dried compost product were consistently well below the 1,000 MPN per gram dry solids US EPA requirement.

With the success of being able to effectively dry the cake/pellet mix in phase 1, the test was re-run with the primary intent of trying to achieve both dryness and adequate temperatures for PFRP and VAR. Also, the dried mixture from the phase 1 testing was recycled to mix with the dewatered sludge, as opposed to using dried sludge pellets, as this would be more representative of steady state operation of an amendment-free composting facility. Due to the speed with which the material dried in phase 1, the initial target blend ratio was set to achieve a wetter 40% solids content mixture with the intention of keeping the compost active longer.

The mixed sludge used for phase 2 of the study consisted of a mix of the dried finished compost product from the phase 1 (recycle) mixed with fresh cake. The recycle included particles significantly larger in size than the heat-dried sludge pellets used in phase 1—the recycle particles were approximately 20 mm in diameter on average vs. about 6 mm in diameter on average for the heat-dried sludge pellets. The larger diameter particles were expected to at least initially provide for good porosity of the composting mix. Some heat-dried sludge pellets from phase 1 were still visible in the recycled compost as well. Mixing was done both in the mechanical mixer and on the floor without issue.

The blended mixed sludge consisted of a 1:1 mix based on volume of cake (21.7% DS, 90% VS, 4.6% TKN, pH 5.8, and C:N 9) and recycle (88% DS, 82.9% VS, 5.5% TKN, pH 7.5, and C:N 8).

On each of days one through three of Phase 2, one cake/recycle charge per day was prepared and loaded into the bay. So, in all, three charges of this cake/recycle mixture were loaded consecutively into the feed end of the bay. As with the Phase 1 test, additional charges of ground green waste were loaded behind the three cake/recycle charges in the composting bay to maintain pile height and provide thermal insulation. The middle charge (charge two) was deemed the "target" charge and was monitored for chemical changes. The middle charge was sampled and tested after one agitation and had the following properties: 41.9% DS, 84.1% VS, 5.2% TKN, pH 7.0, and C:N 9.

Figure 20:
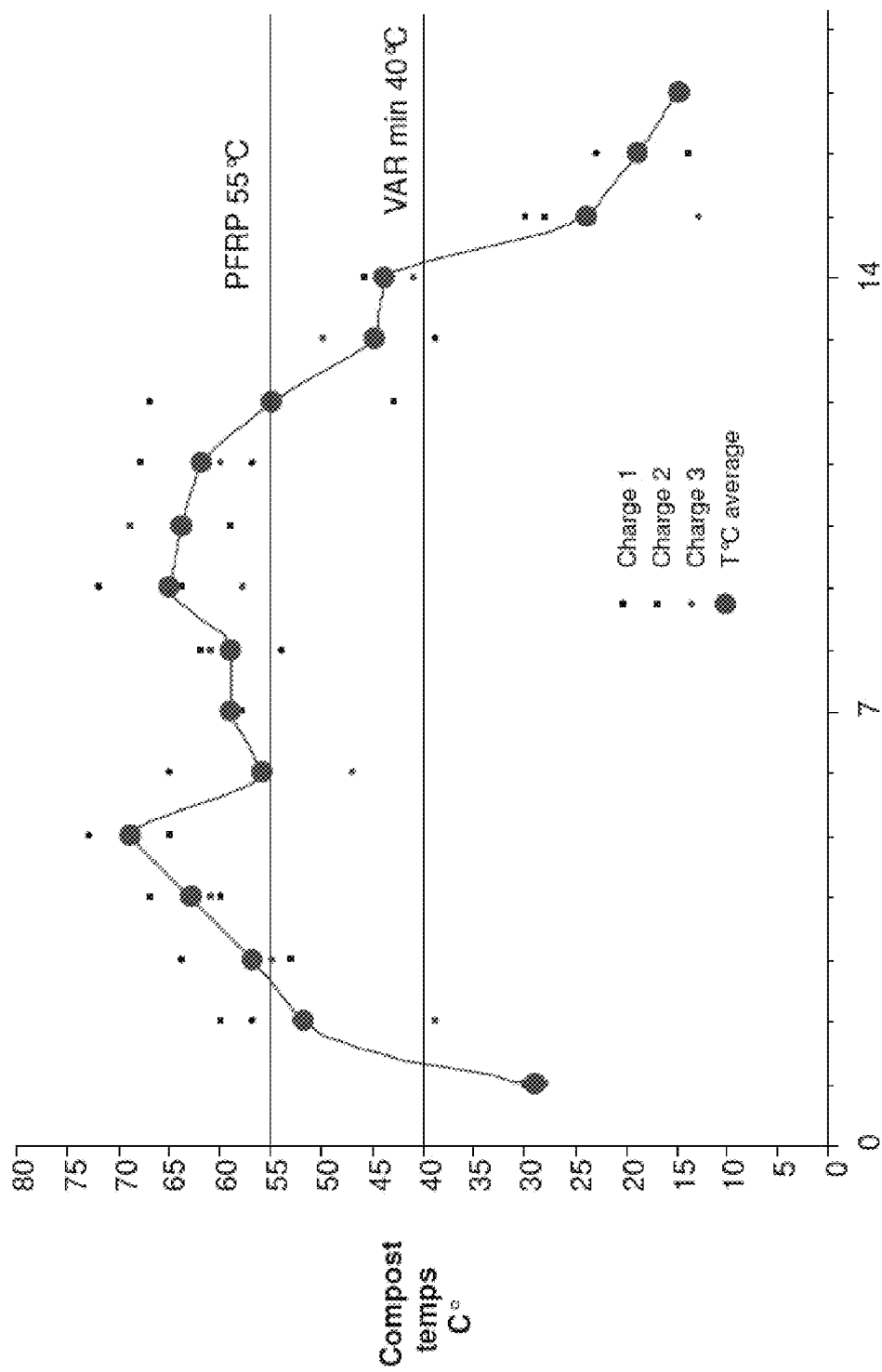
FIG. 20 is a chart of temperature vs. time at multiple positions in a composting bed as recorded during a test performed in accordance with another embodiment of the present disclosure.
Figure 21:
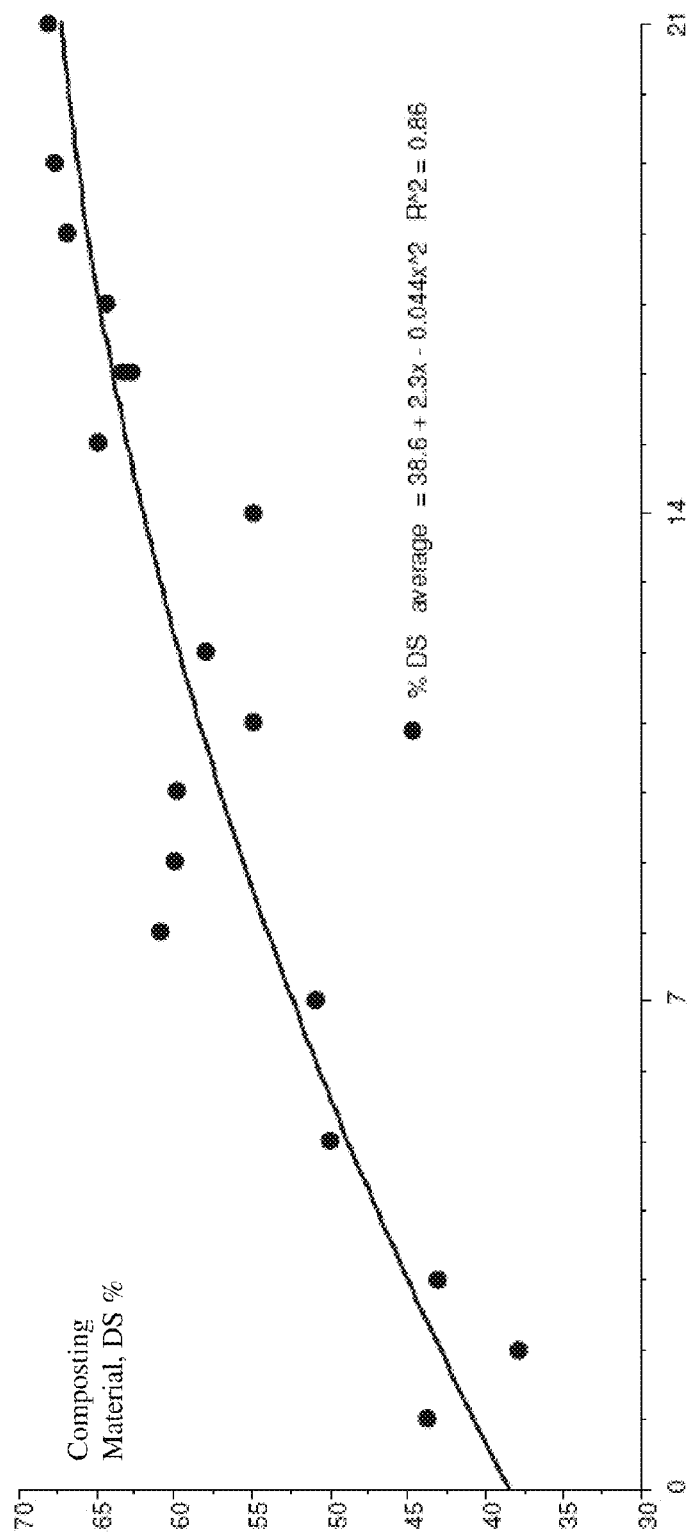
FIG. 21 is a chart of the percent of dry solids vs. time in a composting bed as recorded during a test performed in accordance with another embodiment of the present disclosure.

Aeration blowers were run primarily to optimize the chance of achieving PRFP (3 days at or above 55° C.) and VAR (14 days at or above 40° C.) compliance as early as possible, with drying of the composting mix being a secondary goal. For aeration zone A (the first 40 ft of the bay), the blower was cycled at three minutes on and 15 minutes off. As illustrated in FIG. 20, by day three, the target charges were able to achieve and maintain temperatures in excess of 55° C. PFRP was achieved by day 5 (end of zone A). Solids content of charge two had increased from 41% to 53% during these first five days. In aeration zones B & C (40 ft-110 ft) the blower cycle time was reduced to three minutes on and 30 minutes off to further reduce the rate of drying in an attempt to keep the compost active as long as possible. By about day nine (123 ft or 38 m in to bay) the solids content of the target charge was >60% and the temperature had started to fall off. Therefore, the remaining aeration blowers D and E (116 ft-220 ft or 35 m-67 m) were run at 15 minutes on and five minutes off to optimize the drying process.

Agitation was performed every day except Sunday, when the testing facility did not operate. This was done to take advantage of the temperature increase associated with the agitation process (see FIG. 16) consistent with trying to achieve PFRP and VAR retention time in the bay to allow the best potential for drying. With this frequency of agitation, PFRP was achieved, VAR was effectively achieved, and also the target dryness of 65% DS was achieved within 18 days in the bay.

Phase 2 Results and Discussion
A. Physical Properties of the Mix
1. Stickiness:

No signs of increased stickiness of the phase 2 mixture compared to the phase 1 mixture were evident. As in phase 1, qualitative indications, such as low odors, suggested aerobic conditions existed within the composting materials.
2. Porosity:

For the phase 2 testing, the volume ratio of the 88% solids phase 1 recycle material to the 22% solids sludge used to form the mixed sludge for composting was approximately 1:1. As described above, the size gradation of phase 2 material was significantly larger than the heat-dried pellets used in phase 1. The use of a larger sized mixing material contributed to greater porosity of the mixed sludge in phase 2 versus the mix of phase 1.

Since it was shown in phase 1 that good drying could easily be achieved, agitation was performed every working day (six days/wk) to maintain good porosity of the composting material. The heat-dried pellets from the phase 1 recycle remained recognizable in phase 2 mix until about day nine (midpoint) of the testing.
3. Agitator Amperage Draw:

There were some concerns that the agitator would struggle mechanically as it moved through the target charges. Typically, the agitator requires the least amount of power to provide agitation of composting mixed sludge at the discharge end of the bay where the composting mixed sludge is driest, shallowest and least dense and requires more power to agitate the composting mixed sludge near the front of the bay where the composting mixed sludge is deeper, denser, and wetter.

There was significant pile height drop (approximately 50%) from the inlet to the outlet of the bay. This drop in compost pile height is consistent with most properly run active composting processes wherein the height of the compost pile decreases as moisture is removed. The agitator amperage draw was measured throughout the length of the bay multiple times during both test phases. Non-working amperage draw was 25-30 amps. Normal working amperage draw ranged from 35-45 amps. There was approximately a 10% (five amps) average increase noticed as the agitator moved through the target charges at the front of the bay. This could have been due to the height of the material, as the bays were loaded as high as possible to maximize agitator effort. The agitator amperage draw remained within the acceptable limits of the 30 HP (22.5 KW) agitator motor. By day three of each of the test phases, there was no significant increase in the amperage draw as the agitator moved through the target charges. The 30 HP (22.5 KW) agitator, serving a bay with a cross sectional area of less 39.4 ft$^2$ (3.7 m$^2$), has a much lower power to area ratio @ 0.76 HP/ft$^2$ (6.1 KW/m2) than standard 50 HP @ 1.08 HP/ft$^2$ (8.1 KW/m$^2$) and 100 HP @ 1.25 HP/ft$^2$ (10 KW/m$^2$) IPS agitators currently offered by Siemens Water Technologies Corp. Therefore, this testing indicated that standard IPS agitators should have more than adequate power to process this type of composting material.
4. Heat:

During Phase 2, the aeration protocol (process aeration blower on time) was adjusted (minimized) to maximize temperatures achieved while also attempting to achieve reasonable drying of the composting materials. The temperature of charges one-three was recorded during the course of the Phase 2 testing. The temperatures recorded are illustrated in FIG. 20. As can be seen from FIG. 20, during this part of the study, US EPA pathogen killing temperatures (three consecutive days at or above 55° C.) were achieved. As previously noted, US EPA VAR temperature requirements were nearly achieved; (13 days at or above 40° C., rather than 14 days). Nonetheless, the average temperature during the 13 days plus the 14th non-conforming day averaged over 55° C. It is expected that extending the time in which the composting material maintained a temperature at or over 40° C. could have been accomplished readily with minor adjustment of moisture, aeration strategy, and compost retention time in the bays.
5. Drying:

Good drying of the compost was achieved during phase 2.

During phase 2, the compost temperature was managed by reducing aeration blower on-time to enhance pathogen kill. As a consequence, lower aeration rates resulted in less cooling of the compost, thereby conserving moisture, retaining heat, and generating pathogen killing temperatures.

Nonetheless, the finished compost still achieved 68% DS during the three weeks' composting period.

B. Chemical Properties of the Mix

1. Odors:

Odors produced by the composting process in phase 2 were ordinary. This suggested several things, but the most important was that oxygen was getting into the compost in a sufficient volume to maintain aerobic conditions therein, which indicated that the porosity of the mixed sludge was adequate. This was expected due to the greater porosity of the mixed sludge used in phase 2 versus that used in phase 1.

2. Ammonia.

Like in phase 1, ammonia odors during aeration were substantially lower than originally expected and were unobjectionable. The factors discussed above with reference to phase 1, for example the low pH of the composting mixture and the rapid drying of the mixture, likely contributed to the release of malodorous ammonia gasses being less than originally expected.

Results Summary

The major objectives of this agitated bed composting study were to 1) investigate mechanically enhanced biodrying of dewatered undigested primary and waste activated sludge, and 2) to explore the potential to use heat dried sludge pellets as amendment. The effort succeeded on both counts.

Problems anticipated were excessive odors, stickiness, low porosity, and poor drying. None of these problems were observed. The low C:N ratio of the compostable mix (C:N<10) would normally have released a good deal of ammonia from the composting mix during the composting process. What was observed was that the undigested cake had a pH as low as 5.5. The low pH tended to hold any ammonia formed microbiologically as ammonium, a non-volatile, odorless entity. Even though the pH of the compost increased gradually during the test, ammonia release was not exceptional. Without being bound by a particular theory, it is believed that ammonia release was suppressed as the composting material pH increased because as the pH of the material increased, the dryness also increased, which decreased the amount of biological activity that could have generated ammonia.

Stickiness was limited by the physical composition of the cake and the mix. The undigested cake contained fine, but readily observable paper fibers. These fibers were believed to help contribute structure to the mix, and also to help clean exposed surfaces on the agitator. In addition, the two mm diameter dried sludge pellets utilized in place of traditional amendment material in Phase 1 tended to adhere to the surface of chunks of cake when broken up, keeping these chunks apart, or at least not sticking together. As a result, the mix, which was agitated twice a day for two days and later only once in three days in phase 1 testing, did not collapse into low porosity material. Air flow through the material was adequate and associated moisture loss was readily observed by steam rising from the beds.

Biochemical heat produced by the composting process was adequate to both achieve good drying and achieve PFRP and VAR temperatures. In phase 2, a temperature of over 55° C. was maintained for at least three consecutive days. While the temperature exceeded 40° C. for only 13 days, the average of the 14 day time period exceeded 40° C. Heat generated evaporated and vented moisture from the compost. The pellet amended cake was dried from about 22% solids to about 80% solids during the 24 day phase 1 composting period and from 40% solids to greater than 65% solids during the 18 day Phase 2 test.

Thus, the test of mechanically enhanced biodrying using heat dried sludge pellets or recycled dried sludge compost as a substitute for traditional amendment material while composting dewatered undigested primary and waste activated sludge was successful. These two trials documented that, for this composting technology and for the ambient temperatures during the period of the year that the testing was performed, biodrying is not only possible but may be very successful.

The reading of the foregoing description of certain preferred embodiments by those skilled in the art will bring to mind various possible alterations and modifications within the spirit and scope of the invention. It is intended that the following claims include all such alterations and modifications within the true scope of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of sludge biodrying comprising:
providing a non-cellulosic first material consisting of one of finished compost, dried non-composted undigested sewage sludge having a dry solids content of between about 50% and about 95%, and a combination thereof;
providing a compostable sludge consisting essentially of undigested sewage sludge;
forming a mixed sludge consisting essentially of the first material and the compostable sludge mixed in a ratio of between about 2:1 and about 1:2 by weight when the first material consists of finished compost and in a ratio of between about 1:1 and about 1:2 by weight when the first material consists of dried non-composted undigested sewage sludge, the mixed sludge having a C:N ratio of less than about 15:1 by weight;
introducing the mixed sludge into a composting bay;
aerating the mixed sludge in the composting bay;
providing conditions for the mixed sludge to be maintained aerobically in the composting bay;
mechanically agitating the mixed sludge in the composting bay;
biodrying the mixed sludge with heat produced by a digestive action of microorganisms within the composting bay for a period of time sufficient to form a compost having a dry solids content of between about 50% and about 100% and a C:N ratio less than that of the mixed sludge introduced into the composting bay;
maintaining pH, temperature, and moisture content of the mixed sludge within ranges which suppress the formation of volatile ammonia from ammonium in the mixed sludge throughout the biodrying of the mixed sludge;
removing the compost from the composting bay; and
recycling a portion of the compost as the finished compost.

2. The method of claim 1, further comprising removing particles below a predetermined size from the first material prior to forming the mixed sludge.

3. The method of claim 1, wherein providing a source of a compostable sludge consists of providing a source of dewatered sewage sludge.

4. The method of claim 1, further comprising removing moisture from the mixed sludge.

5. The method of claim 1, wherein heating the mixed sludge comprises heating the mixed sludge to a temperature for a time sufficient to achieve destruction of pathogens within the mixed sludge.

6. The method of claim 5, wherein heating the mixed sludge comprises maintaining a temperature of the mixed sludge of at least about 55° C. for a period of at least 72 hours.

7. The method of claim 5, wherein the time and temperature at which the mixed sludge is treated satisfies the equation $D=131,700,000/10^{0.14t}$ where, D=time in days; and t=temperature in degrees Celsius.

8. The method of claim 1, wherein heating the mixed sludge comprises heating the mixed sludge to a temperature for a time sufficient to deactivate pathogens within the mixed sludge.

9. The method of claim 1, wherein heating the mixed sludge comprises heating the mixed sludge to a temperature sufficient for Vector Attraction Reduction.

10. The method of claim 9, wherein heating the mixed sludge further comprises heating the mixed sludge for a time sufficient for Vector Attraction Reduction.

11. The method of claim 10, wherein heating the mixed sludge comprises heating the mixed sludge to a temperature of at least about 40° C. for at least 14 days.

12. The method of claim 1, wherein a pH of the mixed sludge introduced into the composting bay is less than about 7.0.

13. The method of claim 12, wherein the pH of the mixed sludge introduced into the composting bay is less than about 6.0.

14. The method of claim 1, further comprising providing a portion of the compost removed from the composting bay as a combustible fuel.

15. The method of claim 1, further comprising forming the compostable sludge from pre-screened wastewater.

16. The method of claim 1, wherein agitating the mixed sludge comprises displacing the mixed sludge in the composting bay in a direction from a first end of the composting bay to a second end of the composting bay.

17. The method of claim 1, further comprising sensing a temperature of the mixed sludge at at least one position in the composting bay.

18. The method of claim 17, further comprising generating a signal in response to said temperature.

19. The method of claim 18, further comprising receiving said signal at a controller.

20. The method of claim 19, further comprising actuating a ventilation system to conduct air into the mixed sludge when the temperature thereof rises above a preset value.

21. The method of claim 19, further comprising initiating an agitation of the mixed sludge when the temperature thereof falls below a preset value.

22. The method of claim 1, further comprising sensing a moisture level of the mixed sludge at at least one position in the composting bay.

23. The method of claim 22, further comprising generating a signal in response to the moisture level.

24. The method of claim 23, further comprising receiving the signal at a controller.

25. The method of claim 24, further comprising adding moisture to the mixed sludge when the moisture level thereof falls below a preset value.

26. The method of claim 24, further comprising actuating a ventilation system to conduct air into the mixed sludge when the moisture level thereof rises above a preset value.

27. A method of sludge biodrying comprising:
providing a carbon containing first material;
providing a nitrogen containing compostable sludge;
forming a mixed sludge consisting essentially of the first material and the compostable sludge and having a C:N ratio of less than about 15:1 by weight;
introducing the mixed sludge into a composting bay;
maintaining an average C:N ratio of at least about 8:1 by weight in the mixed sludge in the composting bay;
providing conditions to facilitate the formation of compost from the mixed sludge;
removing the compost from the composting bay; and
recycling a portion of the compost as the first material.

28. The method of claim 27, wherein the first material consists of heat dried undigested sewage sludge.

29. The method of claim 27, wherein the nitrogen containing compostable sludge consists of dewatered sewage sludge.

30. The method of claim 27, wherein the first material consists essentially of a non-cellulosic material.

31. The method of claim 27, wherein the first material consists of compost removed from the composting bay.

32. The method of claim 27, wherein forming the compost comprises:
aerating the mixed sludge in the composting bay;
mechanically agitating the mixed sludge in the composting bay;
providing conditions to facilitate a heating of the mixed sludge within the composting bay; and
reducing a moisture content of the mixed sludge within the composting bay.

33. The method of claim 27, wherein the mixed sludge has a C:N ratio of less than about 15:1 when introduced into the composting bay.

34. The method of claim 27, wherein the pH of the mixed sludge introduced into the composting bay is less than about 7.0.

35. The method of claim 34, wherein the pH of the mixed sludge introduced into the composting bay is less than about 6.0.

36. A composting facility comprising:
a composting bay configured to receive organic waste material and to hold the material while it composts, the composting bay including a frame defining an interior of the composting bay;
a mixed sludge retained within the interior of the composting bay and having an average carbon to nitrogen ratio of less than about 15:1;
a compost handling machine adapted to move along the frame and to extend into the interior of the composting bay to agitate the mixed sludge therein;
a ventilation system in communication with the interior of the composting bay configured to selectively conduct air into the mixed sludge to ventilate the mixed sludge and to facilitate control of the temperature thereof;
a transport system adapted to transport compost from a discharge area of the composting bay to a mixing area; and
a mixing mechanism configured to mix a portion of compost transported from the discharge area of the composting bay with the organic waste material to form the mixed sludge.

37. The composting facility of claim 36, wherein the ventilation system comprises:

a temperature sensor located in the bay configured to sense the temperature of the mixed sludge and to generate a signal in response to the temperature; and a control system connected to the temperature sensor configured to receive the signal and to actuate the ventilation system to conduct air into the mixed sludge when the temperature thereof rises above a preset value.

38. The composting facility of claim 37, wherein the ventilation system maintains a desired temperature profile in the mixed sludge.

39. The composting facility of claim 36, further comprising an odor control system.

40. The composting facility of claim 39, further comprising at least one of an ammonia scrubber and a biofilter.

41. The composting facility of claim 36, wherein the compost handling machine is further adapted to move the mixed sludge through the interior of the composting bay.

42. The composting facility of claim 36, further comprising an analyzer configured to analyze a portion of the mixed sludge and to indicate a concentration of a specified element within the portion of the mixed sludge.

43. The composting facility of claim 36, further comprising a moisture content analyzer configured to analyze the moisture content of organic waste material to be composted and output a first result indicative of the moisture content of the organic waste material.

44. The composting facility of claim 43, wherein the moisture content analyzer is further configured to analyze the moisture content of compost and output a second result indicative of the moisture content of the compost.

45. The composting facility of claim 44, further comprising a controller adapted to receive the first result and the second result output by the moisture content analyzer and to calculate and output a ratio of compost to organic matter to mix to form the mixed sludge based on the first result and the second result.

46. The composting facility of claim 36, further comprising a position sensor configured to monitor a position of the compost handling machine.

47. The composting facility of claim 46, further comprising:

a temperature sensor in thermal communication with a section of the composting bay and configured to generate a signal in response to a temperature of the mixed sludge in the section; and a control system connected to the temperature sensor and to the position sensor and configured to receive a signal from the temperature sensor and from the position sensor and to actuate the ventilation system to conduct air into the mixed sludge in the section when the temperature of the mixed sludge therein is above a preset value and the compost handling machine is positioned in said section.

48. The composting facility of claim 36, further comprising:

a humidity sensor configured to generate a signal in response to a level of humidity in the composting facility; and a control system connected to the humidity sensor and configured to receive the signal from the humidity sensor and to actuate a ventilation fan based upon a comparison of the signal with a predetermined value.

49. The composting facility of claim 48, wherein the control system is further configured to receive a signal from a position sensor configured to monitor a position of the compost handling machine and to increase a speed of the ventilation fan proximate a section of the composting bay when the compost handling machine is located in that section of the composting bay.

50. A method of facilitating a reduction in the consumption of a cellulosic amendment material in a composting operation comprising:

providing instructions for forming a mixed sludge consisting essentially of a carbon containing first material and a nitrogen containing compostable sludge and having a C:N ratio of less than about 15:1; and providing apparatus configured to maintain an average C:N ratio of at least about 8:1 for the mixed sludge once introduced into a composting bay and to maintain the mixed sludge under conditions to facilitate the formation of compost.

51. The method of claim 50, wherein the first material is the compost.

52. The method of claim 1, further comprising maintaining an average C:N ratio of at least about 8:1 by weight in the mixed sludge in the composting bay.

53. The method of claim 1, wherein the mixed sludge has a C:N ratio of between about 8:1 and less than about 15:1 by weight.

54. The method of claim 1, wherein the mixed sludge is formed without the addition of an amendment material.

* * * * *